United States Patent
Ficco et al.

(10) Patent No.: US 6,868,292 B2
(45) Date of Patent: Mar. 15, 2005

(54) DEVICE CONTROL VIA DIGITALLY STORED PROGRAM CONTENT

(75) Inventors: Michael Ficco, Silver Spring, MD (US); Adrian Yap, Gaithersburg, MD (US); Ernest Seah, Gaithersburg, MD (US); Rajeshwari Karthikeyan, Germantown, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 612 days.

(21) Appl. No.: 09/878,855

(22) Filed: Jun. 11, 2001

(65) Prior Publication Data

US 2002/0035404 A1 Mar. 21, 2002

Related U.S. Application Data

(60) Provisional application No. 60/232,375, filed on Sep. 14, 2000.

(51) Int. Cl.[7] .............................. G06F 9/40; G06F 9/44
(52) U.S. Cl. ......................... 700/19; 700/276; 340/3.1; 340/523; 725/78; 725/151; 725/153
(58) Field of Search ................................ 340/517, 523, 340/3.1, 825.52, 825.69, 825.72; 725/151, 153, 78, 79; 700/19, 65, 276, 277, 284, 9, 11, 12, 14, 16; 709/203, 208

(56) References Cited

U.S. PATENT DOCUMENTS

| | | | |
|---|---|---|---|
| 5,621,662 A | 4/1997 | Humphries et al. | |
| 5,822,012 A | 10/1998 | Jeon et al. | 348/553 |
| 5,886,732 A * | 3/1999 | Humpleman | 725/49 |
| 5,922,047 A | 7/1999 | Newlin et al. | 709/217 |
| 6,192,282 B1 * | 2/2001 | Smith et al. | 700/19 |
| 6,198,479 B1 | 3/2001 | Humpleman et al. | 345/329 |
| 6,218,931 B1 | 4/2001 | Asghar et al. | 340/310.02 |

OTHER PUBLICATIONS

Owner's Manual, X–10 CK 11A ActiveHome Automation System, Oct. 23, 1997, pp. 1–56.

ATVEF Enhanced Content Specification, Advanced Television Enhancement Forum, 1998, pp. 1–38.

* cited by examiner

*Primary Examiner*—Emanuel Todd Voeltz
(74) *Attorney, Agent, or Firm*—Georgann S. Grunnbach

(57) ABSTRACT

A method and system of controlling devices with digitally stored content. Devices such as home electronic appliances, lighting systems, heating, ventilating and air conditioning (HVAC) equipment, home security systems and home entertainment systems are controlled from a single, centralized device. A set top box (STB) stores scripts that include program content for controlling the operation of a plurality of these devices from the STB. A user of the STB selects the desired scripts, and the STB accesses the selected scripts from storage based on a triggering mechanism such as time, content, event, etc. The STB selectively controls operation of certain devices designated in the script. The method provides ease of control over multiple and diverse devices, applications and media within a user's own home environment, with more functionality and flexibility than currently available.

36 Claims, 13 Drawing Sheets

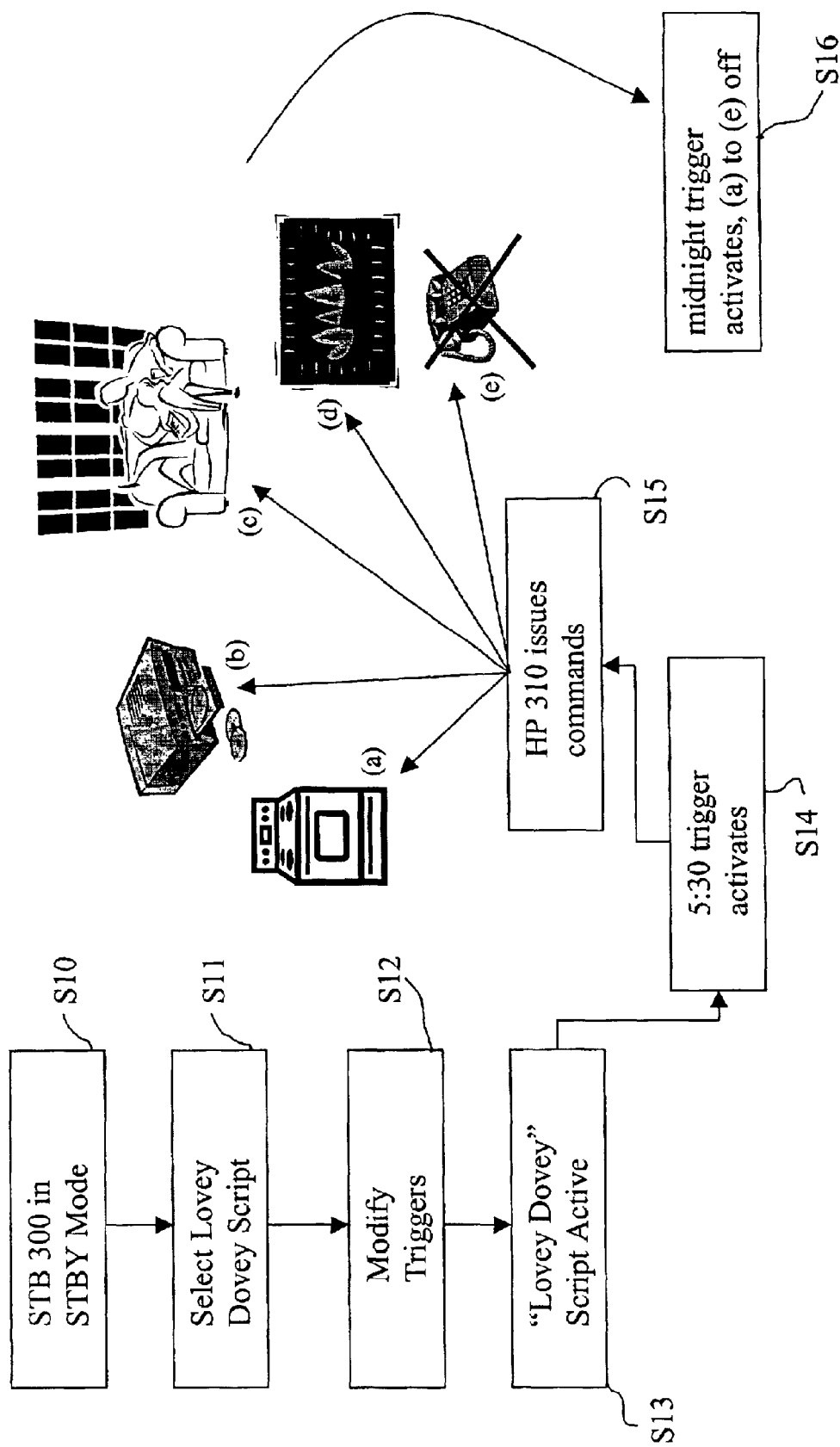

DEVICE CONTROL VIA DIGITALLY STORED PROGRAM CONTENT

This application claims the benefit of provisional application No. 60/232,300 filed on Sep. 14, 2000.

BACKGROUND OF THE INVENTION

1. Technical Field of the Invention

This invention generally relates to applications and features related to controlling various devices, appliances and media via a set top box (STB). More particularly, the present invention is directed to a method and system for controlling external devices, appliances and media based on digitally programmed content stored within the STB.

2. Description of Related Art

A typical household contains several home devices, appliances or equipment (collectively "home devices"). For example, these home devices may include electronic devices as security systems, theatre equipment (e.g., TVs, VCRs, stereo equipment, and direct broadcast satellite services or (DBSS), also known as digital satellite services (DSS)), sprinkler systems, heating, ventilating and air conditioning equipment ("HVAC"), lighting systems, microwaves, dish washers, ovens/stoves, and washers/dryers.

In general, home devices are used to perform tasks that enhance a homeowner's life style and standard of living. For example, a dishwasher performs the task of washing dirty dishes and relieves the homeowner of having to wash the dishes by hand. A VCR can record a TV program to allow a homeowner to watch a particular program at a later time. Security systems protect the homeowner's valuables and can reduce the homeowner's fear of unwanted entry.

Home devices (such as home theatre equipment) are often controlled using a single common control unit, namely a remote control device. This single common control unit allows a homeowner to control and command several different home devices using a single interface. Thus, many manufacturers have developed control units for controlling and commanding their home devices from a single interface.

One drawback associated with using the remote control unit as related to command and control of a home device is that it provides static control and command logic for controlling and commanding each home device. Therefore, a particular remote control unit can only control and command those home devices for which it includes the necessary control and command logic. For example, if a remote control unit comprises logic for controlling a television (TV), a videocassette recorder (VCR), and a digital video device (DVD), but not a compact disk (CD) unit, the remote control unit cannot be used to command and control the CD unit. In addition, as new home devices are developed, the remote control unit will not be able to control and command the new home devices that require command and control logic that was not known at the time the remote control unit was developed.

Another drawback associated with using remote control units is that known remote control units cannot control a plurality of diverse devices, and more particularly cannot control a plurality of devices having different capabilities to communicate with a single, centralized device in order to provide a service.

However, various computer-based home automation or home control systems are being introduced into consumer or subscriber environments. For example, current technology includes computer-based control of AC (alternating current) power line signaling capability to provide various control functions for typical consumer or subscriber premise equipment, such as heating, ventilating and air conditioning equipment ("HVAC"), and appliances such as dishwashers, clothes washers, ovens, ranges, and coffee makers.

As noted above, however, current technology has provided only for separate and application specific control systems, such as a remote control for audio stereo, another remote control for video (television and VCR), separate telephones, a separate thermostat, and separate computer-based interfaces to control AC power line signaling. As of yet, current technology has not provided for a singular, centralized method or system for controlling all home devices and their associated digital video, analog video, video conferencing, and/or telephony functions or applications, etc.

Additionally, no thought has been given to utilizing a centralized apparatus such as a set top box (STB) in order to control all home devices and any associated digital video, analog video, video conferencing, and/or telephony functions or applications within the home. As is known, conventional communications systems typically include a receiver for receiving and processing transmitted waveforms. For example, in a satellite communications system, the receiver may include a small satellite dish connected by a cable to an STB or an integrated receiver-decoder (IRD), which are used as interchangeable terms in the art. The satellite dish is aimed toward the satellites, and the STB is connected to the user's television in a similar fashion to a conventional cable-TV decoder.

A micro-controller controls the overall operation of the STB, including the selection of parameters, the set-up and control of components, channel selection, viewer access to different programming packages, blocking certain channels, and many other functions. The compression and decompression of packetized video signals may be accomplished according to the Motion Picture Expert Group (MPEG) standards and the compression and decompression of audio signals may be accomplished according to the Motion Picture Expert Group (MPEG) standards, DOLBY DIGITAL (or AC-3) standards, DTS or other known standards. The conventional STB also typically includes video and audio decoders in order to decompress the received compressed video and audio. The STB may output video and audio data to a number of destinations, including audio and video decoders, ports, memories, and interface devices, such as a digital VHS (DVHS) interface. The STB may send the same audio and video data to different destinations. Conceivably, this could be in the form of commands to control a variety of peripherally connected devices.

Recently, due to the advances in digital technology and with a goal of creating greater personalization and customization for viewers, the STB has become embodied as part of a digital audio/video recording device or system. These devices incorporate a host of both traditional and powerful new features and functionality. For example, these features may include high quality digital A/V, the ability to pause/rewind live video and/or audio programs as they are broadcast, multi-speed fast forward and fast rewind, instant replay, slow motion and frame by frame advance. Additionally, the viewer may have access to, and have the ability to manipulate or develop an electronic program guide of listings.

Such digital video recording devices allow sports fans and movie buffs alike to have full control of live television programs and sporting events in full digital-quality. Viewers may also be able to create customized programming by searching for, and recording, programs that match their preferences by actor, director, keyword or any combination of content searches. Combined with the wide variety of program selections, viewers may find exactly what they are looking for and even create their own "TV channels" based on their favorite programming.

The electronic program guides generally may be displayed as a menu on a screen of a TV for example. Operation of push buttons on the STB or keys of a remote control may display a series of menu screens having an array of cells corresponding to particular programming events, channels, TV programs, etc. The viewer may scroll through the cells to choose a particular program, pull up another sub menu to find out more information on a particular program, or pull up a sub menu with additional options.

Accordingly, there is a need to apply the above functionality available in an STB to control a variety of diverse applications in the home. This is because many people today value their free time away from the travails of work and child-rearing perhaps to a greater extent than in the past, as they work more hours, on average, than at any time in recent history. In an effort to simplify people's daily routines, current home automation systems have attempted to provide at least a modicum of control in allowing people to configure their particular home devices to essentially operate without much human interaction, thereby enhancing a homeowner's life style and standard of living. But there are still limitations.

As noted, the drawbacks of remote control units and/or separate control devices oft times require people to have an almost PhD-like understanding of how to operate and control these units and/or computer-based home automation systems that were designed in an effort to simplify one's life. Even current home automation systems are generally limited to controlling a selected number of appliances or devices, and have limited graphical-user interface applications that would make the system necessarily user-friendly to the consumer.

What is needed is a method and system that allows the homeowner or person to easily control functions over multiple and diverse devices, applications and media within their own home environment. Further, there is a need for an STB that can take advantage of an essentially unlimited storage capacity and of a plurality of menu driven functions offered by a useable graphical-user interface, to control diverse devices, applications and media within the home, at a centralized location or device, with more functionality and flexibility than what is currently available.

SUMMARY OF THE INVENTION

The present invention is directed to a method and system of controlling the above-described devices with digitally stored content. Devices such as home electronic appliances, lighting systems, heating, ventilating and air conditioning (HVAC) equipment, home security systems and home entertainment systems are controlled from a single, centralized device, the STB. The STB stores scripts that include program content for controlling the operation of a plurality of these devices. A user of the STB selects the desired scripts, and the STB accesses the selected scripts from storage based on a triggering mechanism such as time, date, etc. The script runs so that the STB selectively controls operation of certain devices designated by the script. The method provides ease of control over multiple and diverse devices, applications and media within a user's own home environment with more functionality and flexibility than currently available.

Parameters, features, functions and displays related to the control of home devices based on digitally stored content within the STB include, but are not limited to: menu features that enable the user to select a desired script from a plurality of stored scripts; menu features enabling the user to create a particular desired script depending on the home devices that are configured with the system; menu features enabling the user to access a network service provider to select and download offered scripts, and other attributes associated with the functionality and operation of the STB and overall menu-driven graphical-user interface system. Additionally, a suitable interface such as a remote control, mouse, keyboard or function buttons provided on the STB may be used in order to transmit a command to select desired scripts, program routines, or associated data.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 13 illustrates an example of how a script is triggered and implemented in accordance with the invention.

DETAILED DESCRIPTION

In accordance with the present invention, there is a system and method for controlling devices such as home electronic appliances, lighting systems, heating, ventilating and air conditioning (HVAC) equipment, home security systems and home entertainment systems, based on digitally stored content within a single, centralized device, the STB. The STB stores scripts that include routines for controlling the operation of these devices.

Memory devices within the STB store a plurality of parameters and data typically associated with script to control home devices. A microprocessor within the STB controls STB functionality and display of parameters associated with selection and manipulation of scripts. Control is based on receiving user commands to access the memory and to display at least a selected one of the stored scripts for review and/or manipulation by the viewer on a display device operatively connected to the STB. A suitable interface such as a remote control may be used in order to transmit a command to display desired script parameter(s) or data associated with devices designated in the selected script.

A main menu or guide may be depicted on a suitable display device, to be effected via a user command interface to the STB. This may be by operation of a remote control device, mouse, keyboard or function buttons provided on the STB, in order to send commands or instructions to the microprocessor within the STB. These instructions are related to the scripts and digitally stored program content that are used to control devices in the home for example. This data is manipulated via a graphical user interface (GUI) controlled by the microprocessor.

Therefore, the present invention provides a single centralized device such as an STB to control home electronic appliances, lighting systems, heating, ventilating and air conditioning (HVAC) equipment, home security systems and home entertainment systems. The STB has enhanced functionality as compared to conventional home automation systems, since it utilizes the existing hardware and software architecture of the STB. As will be explained in further detail later in this disclosure, the STB is capable of storing an enormous amount of scripts and program content routines. Moreover, various menu screens associated with script or program content routine features, data or parameters may be displayed and manipulated by the user via a simple, easy-to-use graphical user interface, providing even greater flexibility.

Figure 1:
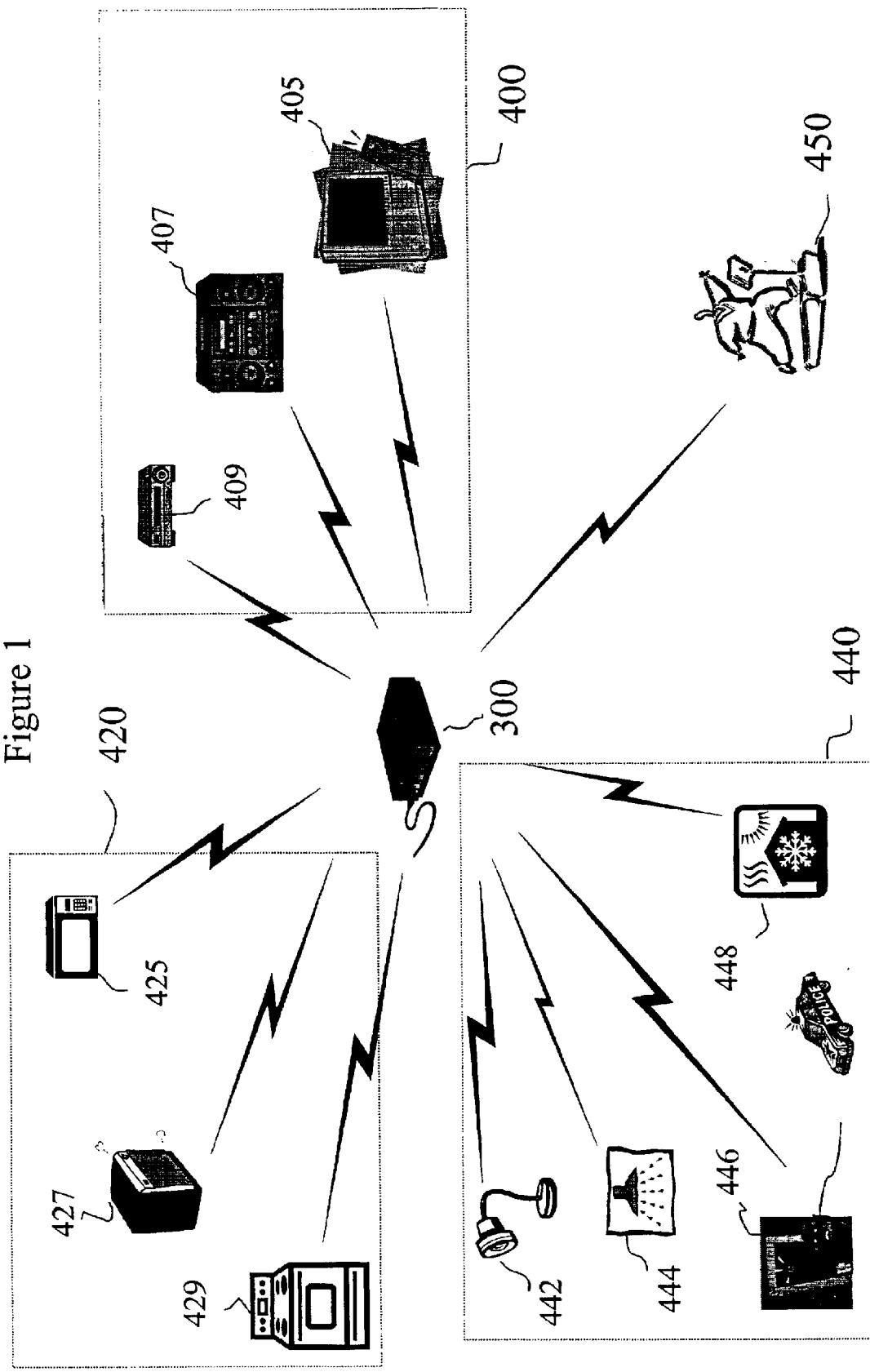
FIG. 1 illustrates an exemplary overview of controlling devices from the STB 300 as envisioned in the invention.

FIG. 1 illustrates an exemplary overview of controlling devices from the STB 300 as envisioned in the invention. As shown in FIG. 1, and STB 300 is operatively in communication with a plurality of devices, such as entertainment or media devices 400 such as TV/home theatre unit 405, stereo system 407, VCR/DVD 409, etc.; home appliances 420 such as microwave oven 425, dishwasher 427, convection oven 429; major home utility service systems 440 such as lighting 442, sprinkler system 444, home security system 446 and heating, ventilating and air conditioning (HVAC) system 448. Optionally, STB 300 could be configured to control or communicate with other electronic devices or systems such as health and fitness equipment (illustrated as icon 450); internet applications such as distance learning websites; other networked computers as part of a home LAN; etc.

STB 300 is in effect a management engine that executes scripts to control various features around the house. For example, a "script" for automation of various home devices can be controlled based on a series of command and control functions that are stored as part of the particular script in the STB 300. In one aspect the, user selects a desired script (i.e., a script to perform the following "program content routines" such as turning on the living room lights, starting the AC unit, and warming the oven) from a database of stored scripts residing in STB 300. In another aspect, a user accesses a subscriber service on-line in order to input or insert preferences for particular scripts that he/she would like downloaded and stored on a memory device within STB 300. The service would then transmit these selected scripts, or even individual program content routines to be stored in the STB 300.

As previously noted; a microprocessor in the STB 300 assumes the central management role to process the scripts in order to perform certain program content routines contained within the designated script, such as operation of the aforementioned major utility systems, control of appliances, interactive distance learning and home entertainment system operation, for example.

Each of the scripts is initiated based on a corresponding triggering mechanism that can be set by the user, via a graphical-user interface (GUI) to the STB 300. These triggers may be based on time (i.e., at 3 pm turn on the security system), content (downloaded homework online), selected television programming, alarm or event or set at random based on user preference. Once a trigger is active, the microprocessor of STB 300 accesses and implements the desired script. Moreover, if a trigger is activated due to an event like an alarm (i.e., due to a malfunction of a device) the STB 300 may run the program content routine in the script to turn off the device and inform the user (such as by sending an email message to his/her PALM PILOT, beep a pager etc). It is also envisioned that STB 300 could be configured to dial 911 if the alarm condition is determined to be an emergency condition.

Communication between STB 300 and other devices, as to be further detailed hereafter, can take many forms. STB 300 can communicate and control devices via the existing electrical wiring within the home; via the transmission of IR signals; and via wireless link signals. Additionally, when the user subscribes to a service offered by an external network service provider (NSP), scripts may be fetched or downloaded via an internet connection, so as to be stored at the STB 300. In such a scenario, device control could operatively be effected using Advanced Television Enhancement Forum (ATVEF) techniques and implementation so that the ATVEF content creator (the NSP) assumes the role of originating the content components of a particular script including graphics, layout, interaction with home devices, and triggers.

However, before describing how the STB 300 is configured to control devices in greater detail, the inventors first offer a general discussion on the set-top box (STB) in a known arena, i.e., as used within a direct broadcast satellite or digital video broadcast (DVB) system. Additionally, the basic architecture and operation of the STB is explained in order to provide a context for the functionality that is possible regarding the ability to control devices via digitally stored content and scripts, which is the focus of this invention.

Figure 2:
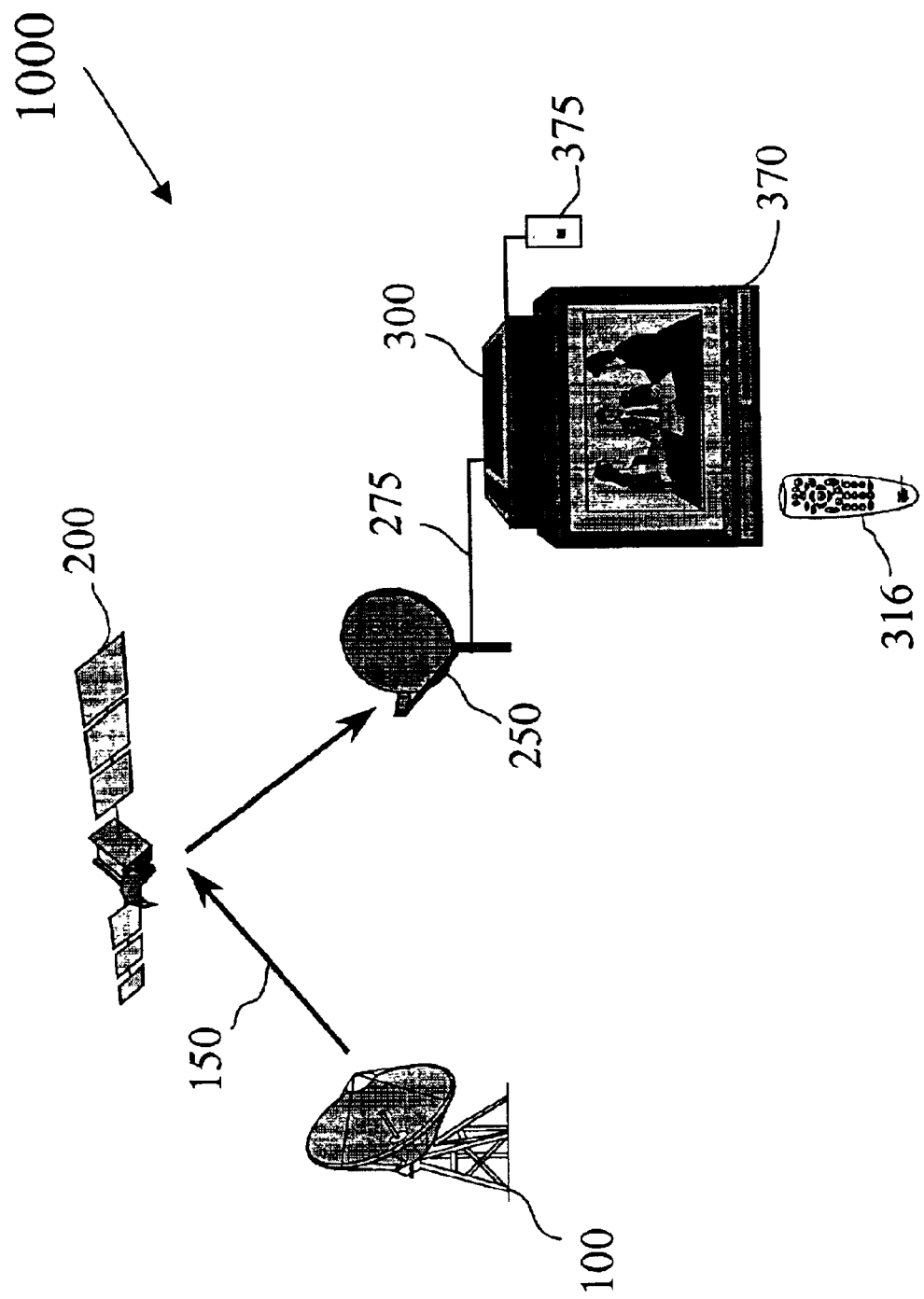
FIG. 2 is an exemplary arrangement of STB 300 within a direct broadcast satellite or digital video broadcast system.

FIG. 2 is an exemplary arrangement of STB 300 within a direct broadcast satellite or digital video broadcast (DVB) system to illustrate the STB 300 in its typical environment. In FIG. 2, the system 1000 may comprise a transmit antenna station (hereinafter referred to as uplink facility 100 for clarity), satellite 200, receive antenna 250, and STB 300.

The transmit antenna station may be a DIRECTV satellite uplink facility, for example, or any other earth station as described above and which is well known in the art. The bitstream or airlink 150 is a suitable content signal such as a digital audio and video television data signal (A/V signal), the medium is a satellite 200, and the receive antenna 250 is preferably an outdoor unit (ODU). As illustrated in FIG. 2, the ODU is connected to STB 300 via coaxial cable 275.

STB 300 may further be connected to a display 370, such as a standard definition television, a high definition television or a PC monitor and also may be connected to a telephone line 375. STB 300 may be controlled via a remote control 316 as is well known in art, using known RF and/or IR transmission and reception techniques.

The user command interface in the present invention however is not limited to a remote control device. Alternatively, any of function buttons residing on the STB, a keyboard or mouse operatively connected thereto and/or connected to a PC that is in communication with the STB, USB ports, voice-activation software devices within or operatively connected to the STB, or command and/or instructions by remote call-in using DTMF (Dual Tone Multifrequency) tones for example, may be substituted as the user command interface to the STB, and/or to control designated functions relating to the selection and generation of scripts and/or program content routines, as will be explained in detail hereinafter.

Figure 3:
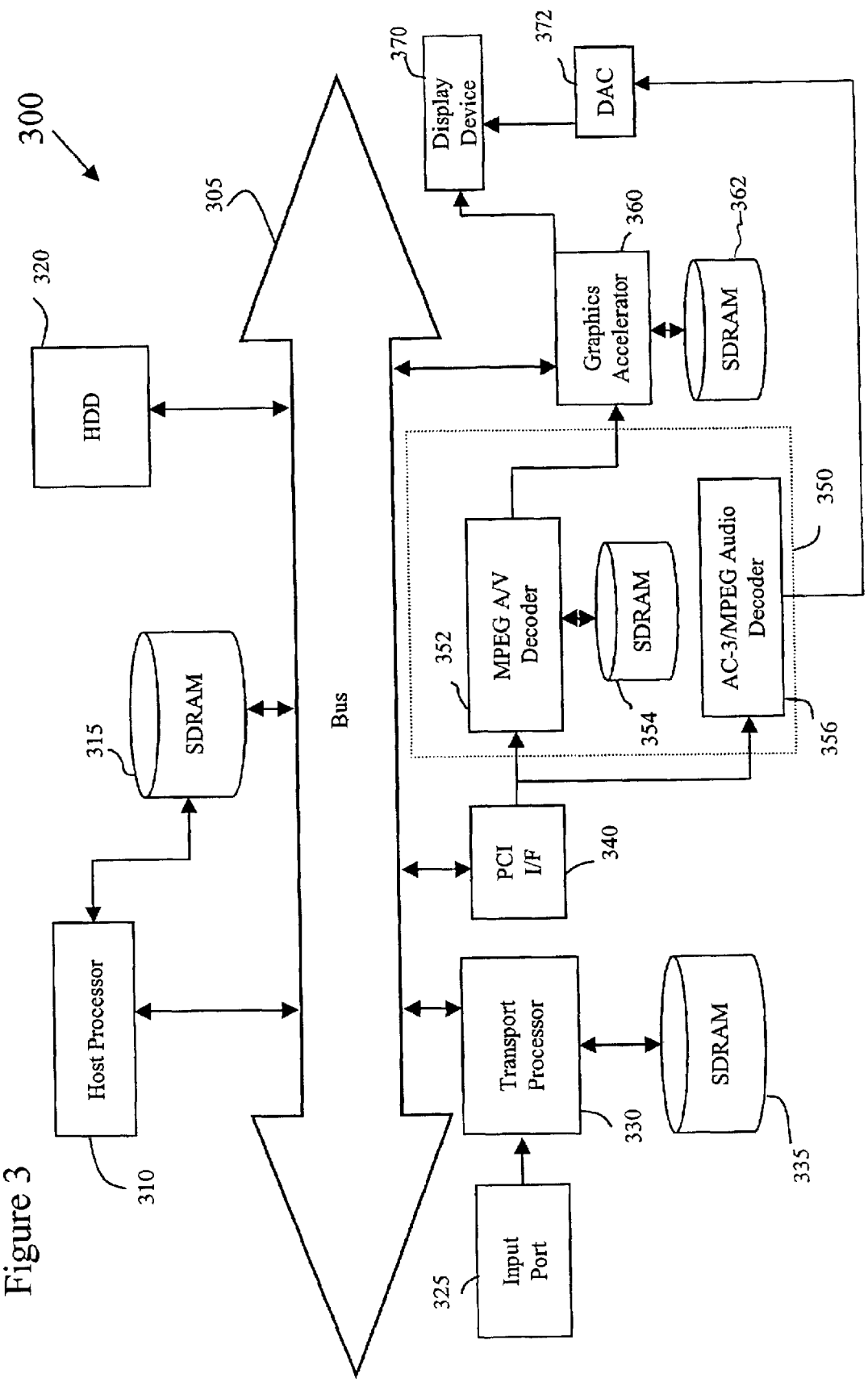
FIG. 3 is a block diagram of an exemplary architecture of the STB 300.

FIG. 3 illustrates an exemplary architecture of the STB 300 in accordance with the present invention. The STB 300 utilizes a bus 305 to interconnect various components and to provide a pathway for data and control signals.

FIG. 3 illustrates a host processor 310, a memory device 315 (in an exemplary configuration embodied as an SDRAM 315) and a hard disc drive (HDD) 320 connected to the bus 305. In this embodiment, the host processor 310 may also have a direct connection to SDRAM 315 as shown in FIG. 3 (i.e., such that SDRAM 315 is associated as the memory for host processor 310). Although memory device 315 is described as SDRAM 315 hereinafter in the present application, memory devices of EDO RAM (extended data output DRAM), BEDO RAM (Burst EDO RAM), RLDRAM by Rambus, Inc., SLDRAM by the SyncLink Consortium, VRAM (video RAM), or any other known or developing memory that is writeable may be sufficient as memory device 315.

As further shown in FIG. 3, a transport processor 330 and PCI I/F 340 (peripheral component interconnect interface) are connected to the bus 305. The transport processor 330 also has a connection to input port 325 and SDRAM 335. SDRAM 335 has the same attributes as SDRAM 315 and may be replaced with any of the other above-noted alternative memory devices. Furthermore, the PCI I/F 340 is connected to a decoder 350. The decoder 350 is connected to a graphics accelerator (GA) 360. The output of GA 360 is in turn sent to a display device 370. Decoder 350 may include both an MPEG A/V decoder 352 and an AC-3/MPEG audio decoder 356, the output of the latter being sent to display device 370 after conversion in a digital-to-analog converter (DAC) 372.

The host processor 310 may be constructed with conventional microprocessors such as the currently available PENTIUM processors from Intel. Host processor 310 performs non real-time and real-time functions in the STB 300, such as control of attached components, graphical-user interface and browser functions. A browser is a software engine that presents the interface to, and interacts with, a user of the STB 300. The browser is responsible for formatting and displaying user-interface components and pictures. Typically, the user interface is displayed as a Graphical User Interface (GUI).

Browsers are often controlled and commanded by the standard HTML language, which is used to position and format the GUI. Additionally, or in the alternative, any decisions and control flow of the GUI that requires more detailed user interaction may be implemented using JavaScript™. Both of these languages may be customized or adapted for the specific details of a given STB 300 implementation, and images may be displayed in the browser using well known JPG, GIF and other standardized compression schemes. It is noted that other non-standardized languages and compression schemes may be used for the browser and GUI, such as XML, "home-brew" languages or other known non-standardized languages and schemes.

HDD 320 is actually a specific example of a mass storage device. In other words, the HDD 320 may be replaced with other mass storage devices as is generally known in the art, such as known magnetic and/or optical storage devices, (i.e., embodied as RAM, a recordable CD, a flash card, memory stick, etc.). In an exemplary configuration, HDD 320 may have a capacity of at least about 25 Gbytes, where preferably about at least 20 Gbytes is available for various recording applications, and the remainder flexibly allocated for pause (live cache) recording applications in STB 300.

The bus 305 may be implemented with conventional bus architectures such as a peripheral component interconnect (PCI) bus that is standard in many computer architectures. Alternative bus architectures such as VMEBUS from Motorola, NUBUS, address data bus, RAM bus, DDR (double data rate) bus, etc., could of course be utilized to implement bus 305.

Transport processor 330 performs real-time functions and operations such as control of the A/V data flow, conditional access, program guide control, etc., and may be constructed with an ASIC (application specific integrated circuit) that contains, for example, a general purpose R3000A MIPS RISC core, with sufficient on-chip instruction cache and data cache memory. Furthermore, the transport processor 330 may integrate system peripherals such as interrupt, timer, and memory controllers on-chip, including ROM, SDRAM, DMA controllers; a packet processor, crypto-logic, PCI compliant PC port, and parallel inputs and outputs. The implementation shown in FIG. 3 actually shows the SDRAM 335 as being separate from the transport processor 330, it being understood that the SDRAM 335 may be dispensed with altogether or consolidated with SDRAM 315. In other words, the SDRAMs 315 and 335 need not be separate devices and can be consolidated into a single SDRAM or other memory device.

Input port 325 receives audiovisual bitstreams that may include, for example, MPEG-1 and MPEG-2 video bitstreams, MPEG-1 layer 11 audio bitstreams and DOLBY DIGITAL (AC-3) audio bitstreams. Exemplary A/V bitrates may range from about 60 Kbps to 15 Mbps for MPEG video, from about 56–384 Kbps for MPEG audio, and between about 32–640 Kbps for AC-3 audio. The single-stream maximum bitrate for STB 300 may correspond to the maximum bitrate of the input programming, for example 16 Mbps or 2 MBps, which corresponds to the maximum MPEG-2 video bitrate of 15 Mbps, maximum MPEG-1 Layer-2 audio bitrate of 384 kbps, and maximum AC-3 bitrate of 640 kbps.

Any audio or video formats known to one of ordinary skill in the art could be utilized. Although FIG. 3 has been described in conjunction with digital television, the signal supplied could be any type of television signal, any type of audio or video data, including of course analog voice data over a telephone line, or any downloadable digital information. Of course, various other audiovisual bitstream formats and encoding techniques may be utilized in recording. For example, STB 300 may record an AC-3 bitstream, if AC-3 broadcast is present, along with MPEG-1 digital audio. Still further, the received audiovisual data may be encrypted and encoded or not encrypted and encoded. If the audiovisual data input via the input port 325 to the transport processor 330 is encrypted, then the transport processor 330 may perform decryption. Moreover, the host processor 310 may perform the decryption instead.

Alternatively, the host processor 310 and transport processor 330 may be integrated or otherwise replaced with a single processor. As mentioned above, the SDRAMs (315 and 335) may be consolidated or replaced with a single SDRAM or single memory device.

The PCI I/F 340 may be constructed with an ASIC that controls data reads from memory. Audiovisual (A/V) data may be sent to the host processor 310's memory (SDRAM 315) while simultaneously being sent to an MPEG A/V decoder 352, as further discussed below.

Decoder 350 may be constructed as shown in FIG. 3 by including the MPEG A/V decoder 352 connected to the PCI I/F 340, as well as an AC-3/MPEG audio decoder 356 that are also connected to the PCI I/F 340. In this way, decoders 352 and 356 can separately decode the video and audio bitstreams from the PCI I/F 340, respectively. Alternatively, a consolidated decoder may be utilized that decodes both video and audio bitstreams together. The encoding techniques are not limited to MPEG and AC-3, of course, and can include any known or future developed encoding technique. In a corresponding manner, the decoder 350 could be constructed to process the selected encoding technique(s) utilized by the particular implementation desired.

In order to more efficiently decode the MPEG bitstream, the MPEG A/V decoder 352 may also include a memory device such as SDRAM 354 connected thereto. This SDRAM 354 may be eliminated, consolidated with decoder 352 or consolidated with the other SDRAMs 315 and/or 335. SDRAM 354 has the same attributes as SDRAM 315 and 335, and may be replaced with any of the other above-noted alternative memory devices.

A graphics accelerator (GA) 360 includes processing circuitry for performing graphics processing of a decoded input video stream, and encoding circuitry for encoding and converting the processed video to analog prior to outputting it to display device 370. GA 360 also includes a memory interface that communicates with an SDRAM 362 in order to direct the incoming video bit stream to a specific storage location in SDRAM 362, and also selects the frames and frame order for display.

Display device 370 may be an analog or digital output device capable of handling a digital, decoded output from the GA 360. If analog output device(s) are desired, to listen to the output of the AC-3/MPEG audio decoder 356, a digital-to-analog converter (DAC) 372 is connected to the decoder 350. The output from DAC 372 is an analog sound output to display device 370, which may be a conventional television, computer monitor screen, portable display device or other display devices that are known and used in the art. If the output of the AC-3/MPEG audio decoder 356 is to be decoded by an external audio component, a digital audio output interface (not shown) may be included between the AC-3/MPEG audio decoder 356 and display device 370. The interface may be a standard interface known in the art such as a SPDIF audio output interface, for example, and may be used with, or in place of DAC 372, depending on whether the output devices are analog and/or digital display devices.

The video output from GA 360 and/or audio output from audio decoder 356 or DAC 372 does not necessarily have to be sent to display device 370. Alternatively, encoded A/V data may be output to external devices or systems operatively connected to the STB 300, such an off-broadcast system, cable TV system or other known systems that can reproduce the encoded audio and/or video signals for reproduction and/or display. This may also include a PC that can play video or audio files containing the encoded A/V data sent from the STB 300, for example. In such an embodiment, text or voice files could be sent from the STB 300 to the PC in the form of an e-mail message with text or sound file as an attachment thereto, as will be explained in more detail hereinafter.

Figure 4:
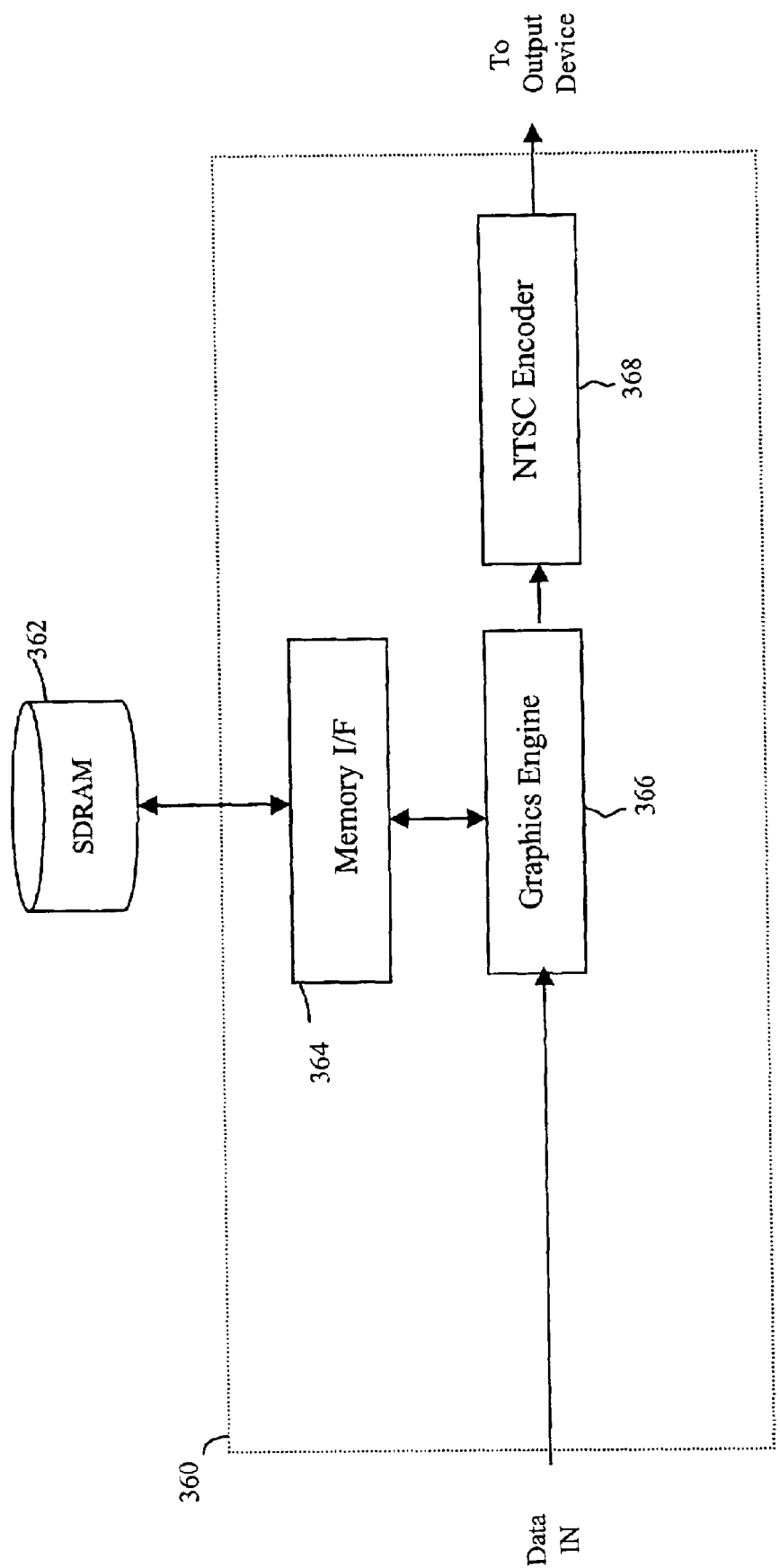
FIG. 4 is a block diagram showing an exemplary construction of the graphics accelerator according to the invention.

FIG. 4 is a block diagram showing an exemplary construction of the graphics accelerator according to the invention. The GA 360 preferably is a graphics chip that includes a memory interface (I/F) 364 to SDRAM 362, a graphics engine 366 and a TV encoder 368. The memory interface 364 and TV encoder 368 are shown embedded in GA 360; however, these components may be separate or external from GA 360.

Memory I/F 364 is preferably an industry standard SDRAM interface, but may also be one of a PCI bus, RAM bus, DDR (double data rate) and EDO RAM (Extended Data Output DRAM) interface used in the art. Memory I/F 364 controls access to a display memory portion in SDRAM 362. In particular, memory interface 364 informs the incoming video data where it is to be stored in SDRAM 362. Additionally, memory I/F 364 selects the decoded data (which are being stored in SDRAM 362) that are going to be displayed on display device 370.

Graphics engine 366 may preferably be a 64-bit DRAM based XVGA controller with hardware accelerated BitBLT (bit block transfer), video playback and video capture to a frame buffer (SDRAM 362 for example). However, graphics engine 366 should not be limited to this specific implementation. In other words, the graphic engine 366 may be implemented with other controller technologies.

TV encoder 368 is preferably an NTSC encoder that encodes, or converts the digital video output from graphics engine 366 into a coded analog signal for display. Regarding the specifications of the NTSC (National Television Standards Committee) encoder 368, the NTSC is responsible for setting television and video standards in the United States. The NTSC standard for television defines a composite video signal with a refresh rate of 60 half-frames (interlaced) per second. Each frame contains 525 lines and can contain 16 million different colors.

In Europe and the rest of the world, the dominant television standards are PAL (Phase Alternating Line) and SECAM (Sequential Color with Memory). Whereas NTSC delivers 525 lines of resolution at 60 half-frames per second, PAL delivers 625 lines at 50 half-frames per second. Many video adapters or encoders that enable computer monitors to be used as television screens support both NTSC and PAL signals. The SECAM standard was introduced in the early 1960's and implemented in France. SECAM uses the same bandwidth as PAL but transmits the color information sequentially. SECAM runs on 625 lines/frame.

Thus, although use of an NTSC encoder for TV encoder 368 is envisioned to encode the processed video for display on display device 370, the present invention is not limited to this standard encoder. PAL and SECAM encoders may also be utilized. Further, developing HDTV encoders may also be viable to encode the processed video for display on a HDTV, for example.

SDRAM 362 is similar in its construction to SDRAM 315. SDRAM 362 provides the extra frame buffers (sufficient memory, preferably at least 2 Mbyte or greater) necessary to temporarily store the decoded data prior to being output for display on display device 370.

As seen in FIG. 4, the decoded video data is input into graphics engine 366, whereby it is subject to graphics processing to prepare the data for system to display transfer. Memory interface 364 instructs SDRAM 362 to output the selected data for playback to graphics engine 366. Thereafter, the data for display can be encoded and converted to analog at TV encoder 368 before being sent to display device 370.

Figure 5:
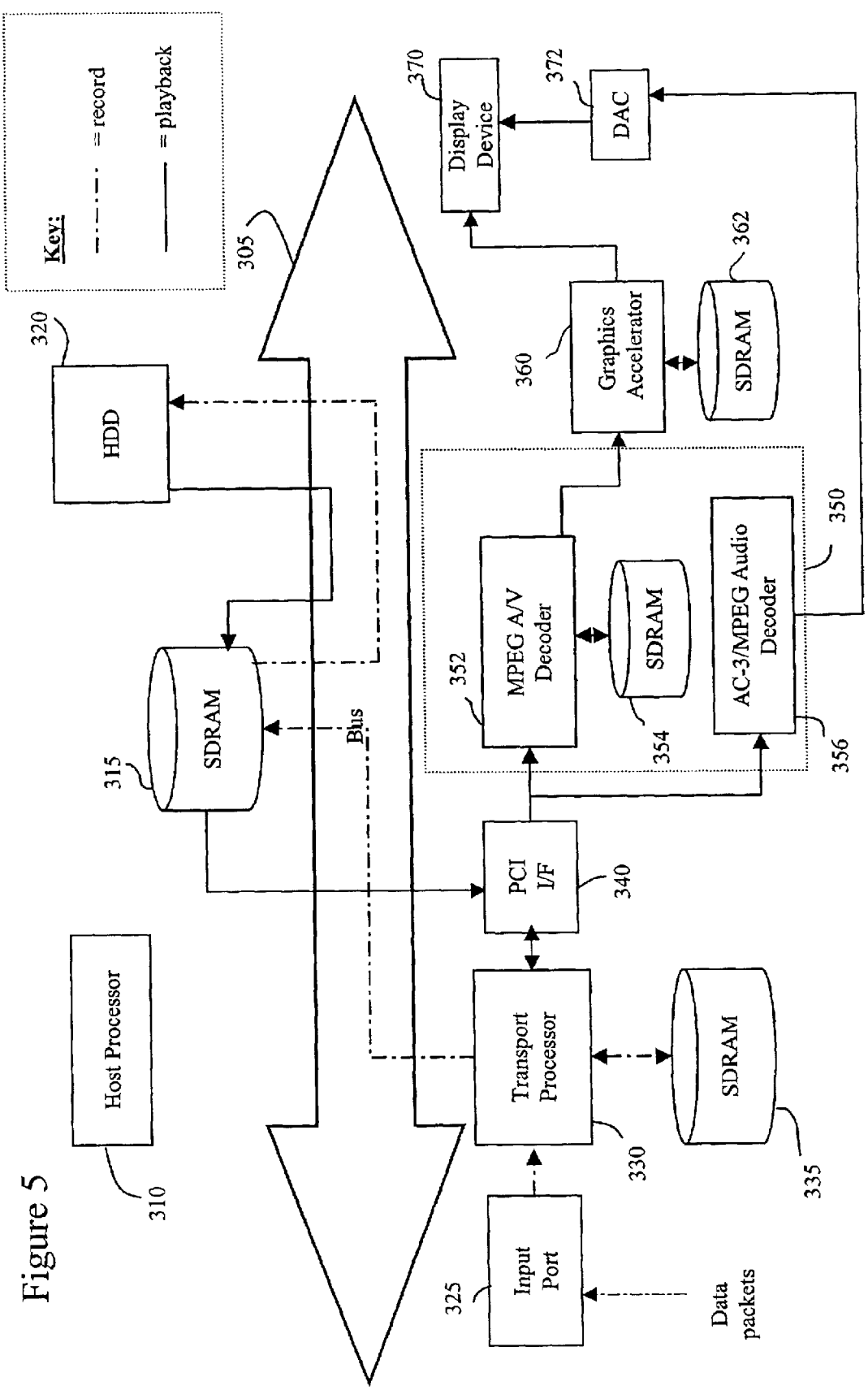
FIG. 5 illustrates an exemplary record path to record scripts in accordance with the present invention.

General recording and playback paths of the STB 300 are described in accordance with FIG. 5. Some of the connections between components, and associated reference numerals from FIG. 3 may have been eliminated in FIG. 5 in order to highlight the data flow that is shown using dashed lines (see Key).

As shown in FIG. 5, A/V data of a selected or desired event, program and/or broadcast is received by input port 325 (typically the data is received in packetized and encrypted form) and fed to the transport processor 330. The transport processor 330 then transfers the received A/V data to SDRAM 315. Digital recording is accomplished by the host processor 310, which transfers the A/V data buffered by SDRAM 315 to the HDD 320. In other words, the SDRAM 315 serves as a buffer that buffers data sent by transport processor 330. This allows the host processor 310 to control the recording onto the HDD 320 when host processor 310 time is available. When a sufficient amount of programming data has been accumulated in the SDRAM 315, the host processor 310 transfers the data from the SDRAM 315 to the HDD 320 for recording therein.

In an alternative record path, A/V data is fed from the input port 325 to the transport processor 330. The transport processor 330 then transfers the received audiovisual data to the PCI I/F 340. The PCI I/F 340 receives audiovisual data from the transport processor 330 via bus 305, and sends this data to host processor 310, more particularly to SDRAM 315.

Digital recording is accomplished similarly, with SDRAM 315 serving as a buffer that temporarily stores data sent by the PCI I/F 340. This allows the host processor 310 to control the recording onto the HDD 320 when processor time is available. When a sufficient amount of A/V data has been accumulated in the SDRAM 315, the host processor 310 transfers the data from the SDRAM 315 to the HDD 320 for recording therein. To record data, the host processor 310 may also inform the PCI I/F 340 of available start addresses in the SDRAM buffer space 315 to which data may be buffered for eventual recording in HDD 320.

The operation of playing back the recorded A/V data that represents a stored event, program, broadcast, etc. in STB 300 is now described. Referring again to FIG. 5, when the viewer turns the STB 300 on, the viewer is given the option to playback any of the previously recorded programs, events, broadcast, phone messages, etc. This may be done, for example, by using a remote control or other suitable user command interface (not shown) to access a menu on display device 370. If the viewer selects a desired event, the corresponding A/V data (which typically may also include system time and conditional access packets) are retrieved from HDD 320.

In particular, when the user selects the playback option, the selected A/V data recorded on HDD 320 is sent via bus 305 to a queue in SDRAM 315. Next, the buffered data is sent from SDRAM 315 via bus 305 PCI I/F 340, which in turn sends the selected A/V data to decoder 350. More specifically, the video portion of the bitstream is sent to MPEG A/V decoder 352, with the audio portion being sent to AC-3/MPEG audio decoder 356.

Within decoder 350, MPEG A/V decoder 352 may be provided with an SDRAM 354 in order to more efficiently decode the MPEG bitstream received from PCI I/F 340. SDRAM 354 is similar to SDRAM 315 discussed above in its construction. SDRAM 354 temporarily holds the encoded video bitstream data, and also provides the three frame buffers required for MPEG decoding, as is known in the art. Thereafter, the decoded A/V data is output to GA 360 for conversion to an analog format, so that it may be displayed on display device 370. From this point on, the playback data looks, for all intents and purposes, identical to the originally recorded event, program, broadcast, etc.

Up to this point, the overall architecture of the STB has been illustrated and briefly described in connection with a known function of the STB, that is: the displaying and recording of content received via a satellite or other source. However, the focus of controlling devices with digitally stored content in STB 300 resides in the functionality of the host processor 310, its communication with various home devices, HDD 320 and its storage ability, and the menu screens that may be viewed and manipulated on display device 370 or other suitable display in order to select, create and run desired scripts for device control.

Figure 6:
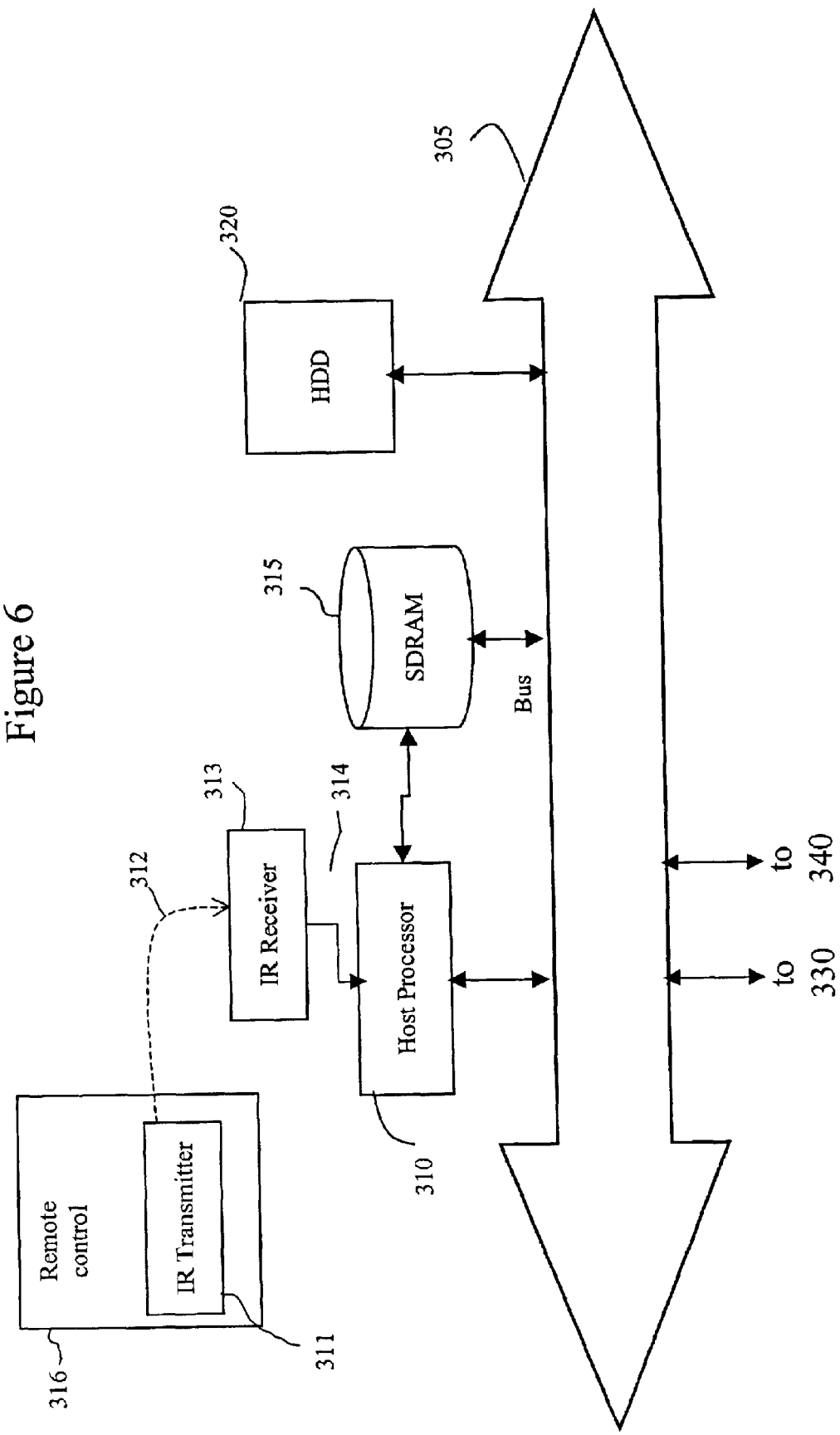
FIG. 6 illustrates a partial block diagram of FIG. 3 to show an exemplary communication path between a remote control 316 and the host processor 310 of the STB 300.

FIG. 6 illustrates a partial block diagram of FIG. 3, so as to show an exemplary communication path between a remote control device 316 and the host processor 310 of STB 300. In FIG. 6, there is illustrated a remote control device 316 that is in communication with the host processor 310 in order to send commands for operating features or functions of the STB 300 and/or to display menus associated with script selection and/or creation, operation and functionality on display device 370 for example. Remote control 316 is primarily used to navigate a series of menus provided by STB 300 in order to select, create and or modify desired scripts to be run by the user. Alternatively, the remote control device could be a universal remote control with artificial intelligence capabilities to control and/or learn how to control various individual devices (i.e., entertainment system, security system, lighting, etc.).

As is well known in the art, the remote control device 316 may include a remote control transmitter 311 therein for transmitting various key or pushbutton-associated signals (commands) selected by the viewer or user to perform certain STB 300 functions, to display certain parameters or data associated with the STB 300. These are sent in the form of an infrared (IR) ray signal 312 for example, to the STB 300, and in particular to an IR receiver 313 that may be operatively connected to host processor 310. It is envisioned that transmit and receive operations performed by transmitter 311 and receiver 313 may be replaced by a suitable transceiver (not shown). IR receiver 313 decodes the received infrared ray signal 312, such as by photoelectric conversion for example, and sends a system drive signal 314

(which is preferably a digital signal) to host processor 310. The host processor 310 thus analyzes the composed code information (i.e., the command data generated by the user) corresponding to the received system drive signal 314. This may be a command to display a desired script or program content routine, or menu or user-interface feature of the STB 300, for example.

Although the above communication path and interface to the STB 300 explained with regard to using a remote control device, commands and/or processing necessary for manipulation and operation of the scripts may also be initiated by a user actuating buttons, switches and/or keys that may be provided on, and integral with STB 300. Moreover, these buttons, switches and/or keys may interact with software or package programs within STB 300 (i.e., provided within SDRAM 315, HDD 320 or as part of host processor 310) in order to effect display of a particular parameter on a screen of a device. These alternative interfaces provide redundancy for the user, as well as alternative means to display parameters, menus or functions associated with the scripts and/or program content routines.

Figure 7:
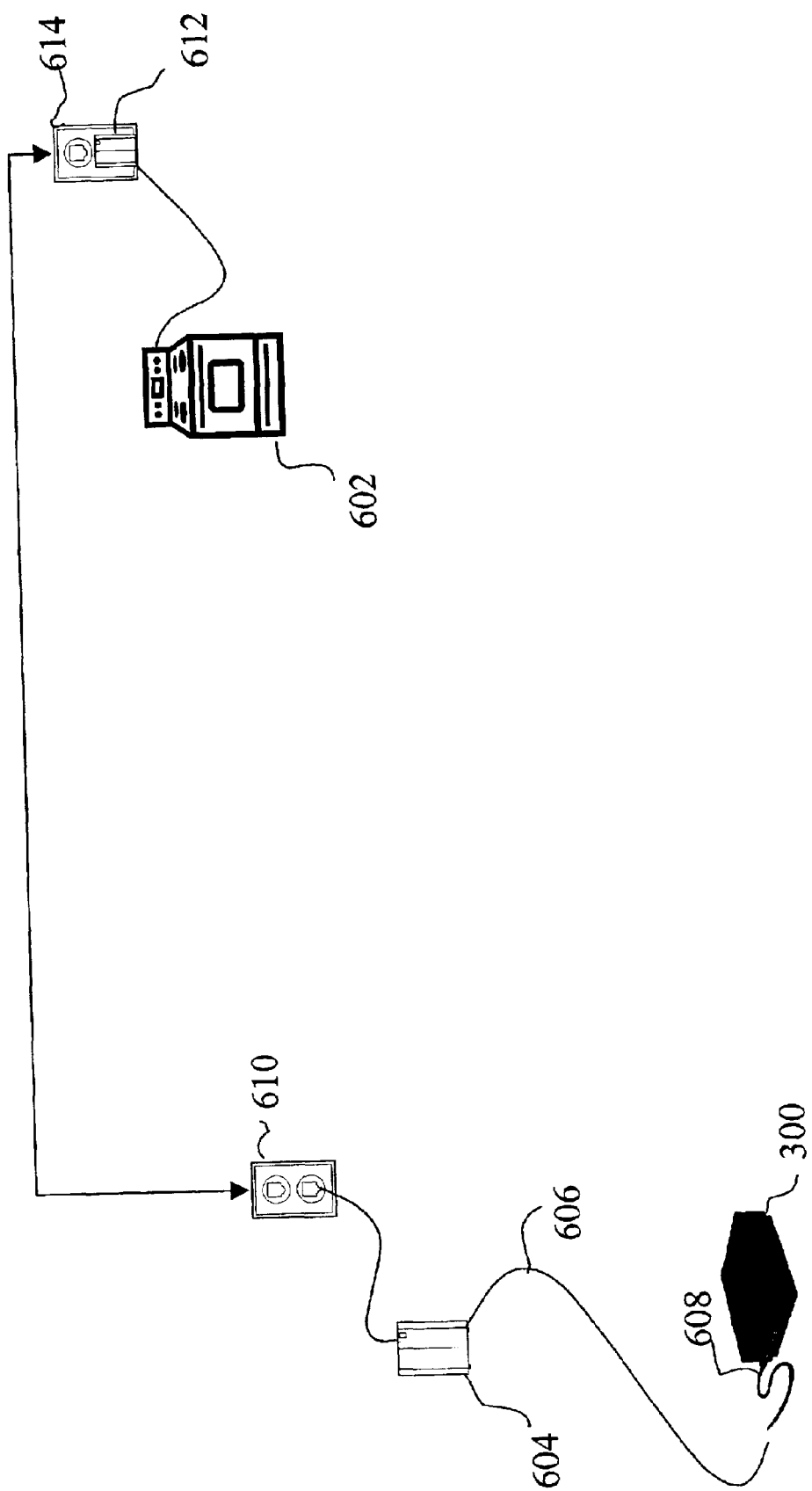
FIG. 7 illustrates a communication path configuration between STB 300 and home devices using existing electrical wiring.

FIG. 7 illustrates communication of the STB 300 with connected devices over existing electrical wiring. The present invention provides for centralized and remote control over electric and electronic appliances and devices in the home from STB 300. In particular, as shown in FIG. 7, electrical sockets and electrical switches with transceivers are used that communicate over a house's electrical wiring system. STB 300 communicates with various devices (singularly depicted as element 602), via an interface 604. Interface 604 is similar to those used in known home automation systems, and typically includes a cable 606 that plugs into a serial port 608 of STB 300 at one end, and into the interface 604 at the other end. The interface is plugged in to a standard wall outlet 610. The device 602 sockets and switches are generally configured as a module 612 that is operatively connected to device 602 at a localized wall outlet 614. If device 602 is to be operated via remote control, module 612 may be configured as a transceiver module (not shown).

In operation, module 612 receives commands from and/or provides status information to the STB 300, which is also plugged into the house's wiring, as noted above. The host processor 310 in particular is configured to interface with the house wiring via interface 604. With the devices 602 connected through this system, a user can readily execute simple control over the devices from the STB 300 by way of the selected script, so as to turn lights off/on, dim lights, set stereo equipment to turn on/off at predetermined or random times, and other similar functions.

The devices 602 in the configuration illustrated in FIG. 7 communicate through high-frequency pulses (typically 120 kHz) transmitted on the home wiring grid, for example, during the zero-crossings of the 120 VAC/60 Hz voltage cycles. The presence or absence of a high-frequency pulse indicates a binary 1 or 0. The information is communicated with some redundancy: the two zero-crossings in each 60 Hz cycle are used to transmit one bit. If the high-frequency pulse is present during the first zero-crossing, it will be absent during the second, and vice-versa. In this version of the signaling system, the devices 602 communicate at a rate of up to at least 60 bits per second.

It is recognized, however, that more sophisticated signaling techniques may be necessary for transmitting information to and from devices 602 that are designated in a particular script. It may be useful, for example, to have increased data rates, enhanced noise immunity, simultaneous communication with more than one device, or the ability to communicate on a network other than the home wiring grid. Similarly, each device might require a complex input stack for monitoring all of the commands over the system instead of just the commands relevant to that particular device.

The present invention foresees that more hardware and computing power may also be required to support it. As a result, the present invention has simplified software and hardware requirements to require essentially the host processor 310 with embedded algorithms and software (depending on the application), the HDD 320 and various peripheral interfaces connected thereto in which to communicate with designated devices. Further, if an external network service provider is to provide scripts in the form of downloadable data, the service provider may also provide various software requirements and support in order to facilitate desired operating conditions.

Figure 8:
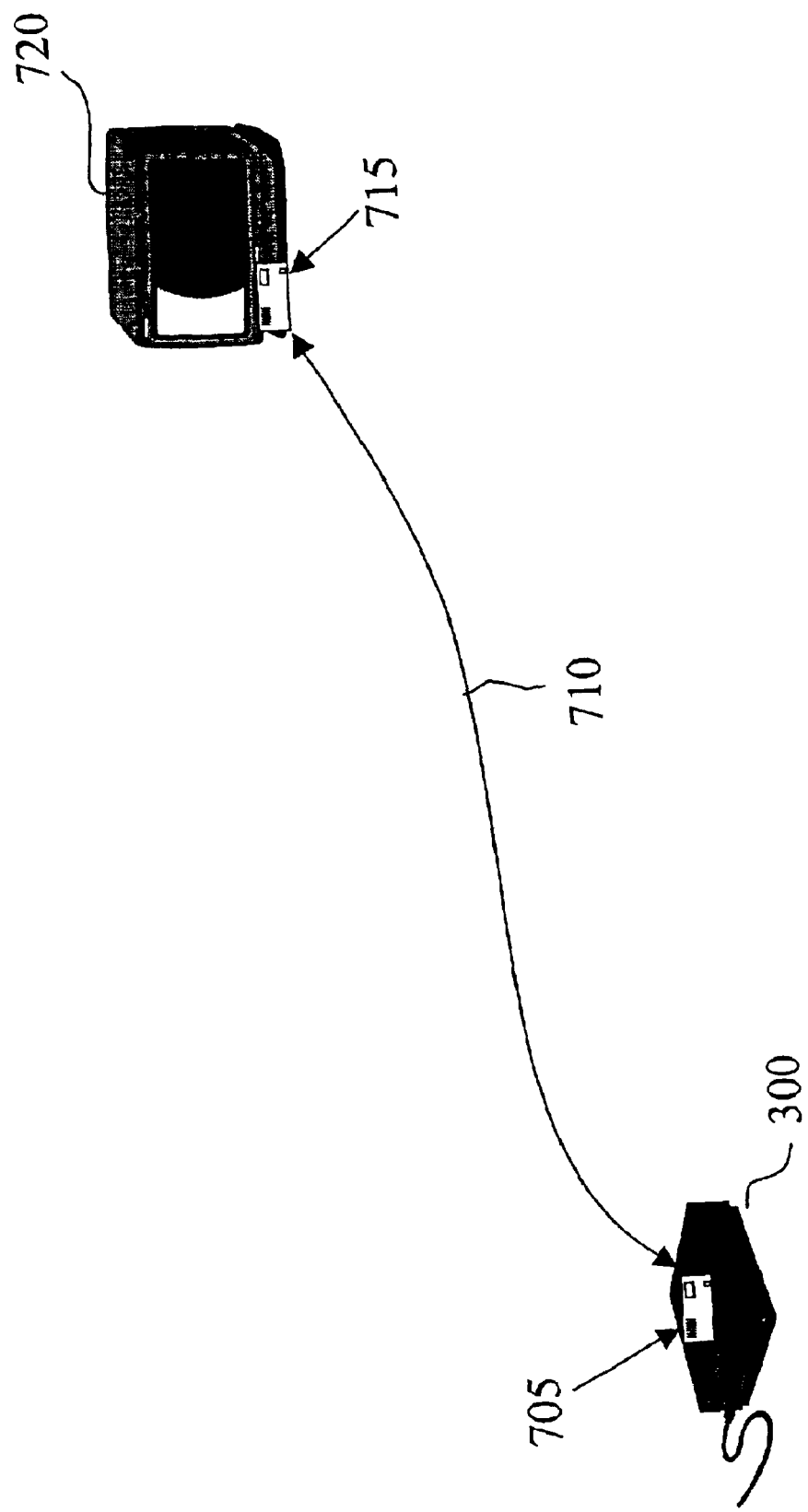
FIG. 8 illustrates a communication path configuration between STB 300 and home devices using infrared transmitters and receivers.

FIG. 8 illustrates another exemplary communication path configuration between STB 300 and the devices using infrared transmitters and receivers. Instead of using existing electrical wiring, the devices and STB can be configured with infrared components in order to communicate. As shown in FIG. 8, the STB 300 would include a transceiver 705 that would transmit script command and control data as an IR ray signal 710 to a designated device, here shown as a TV 720. TV 720 and other devices are outfitted with a suitable IR receiver 715 to receive the command data, decode the ray signal into a suitable local system drive signal in order to initiate device operation.

The inventors recognize that currently existing IR technologies are limited in terms of overcoming physical interferences which could block an/or deflect the ray signal between components. However, the concept is viable in light of the method in which communication may be effected utilizing IR techniques.

Figure 9:
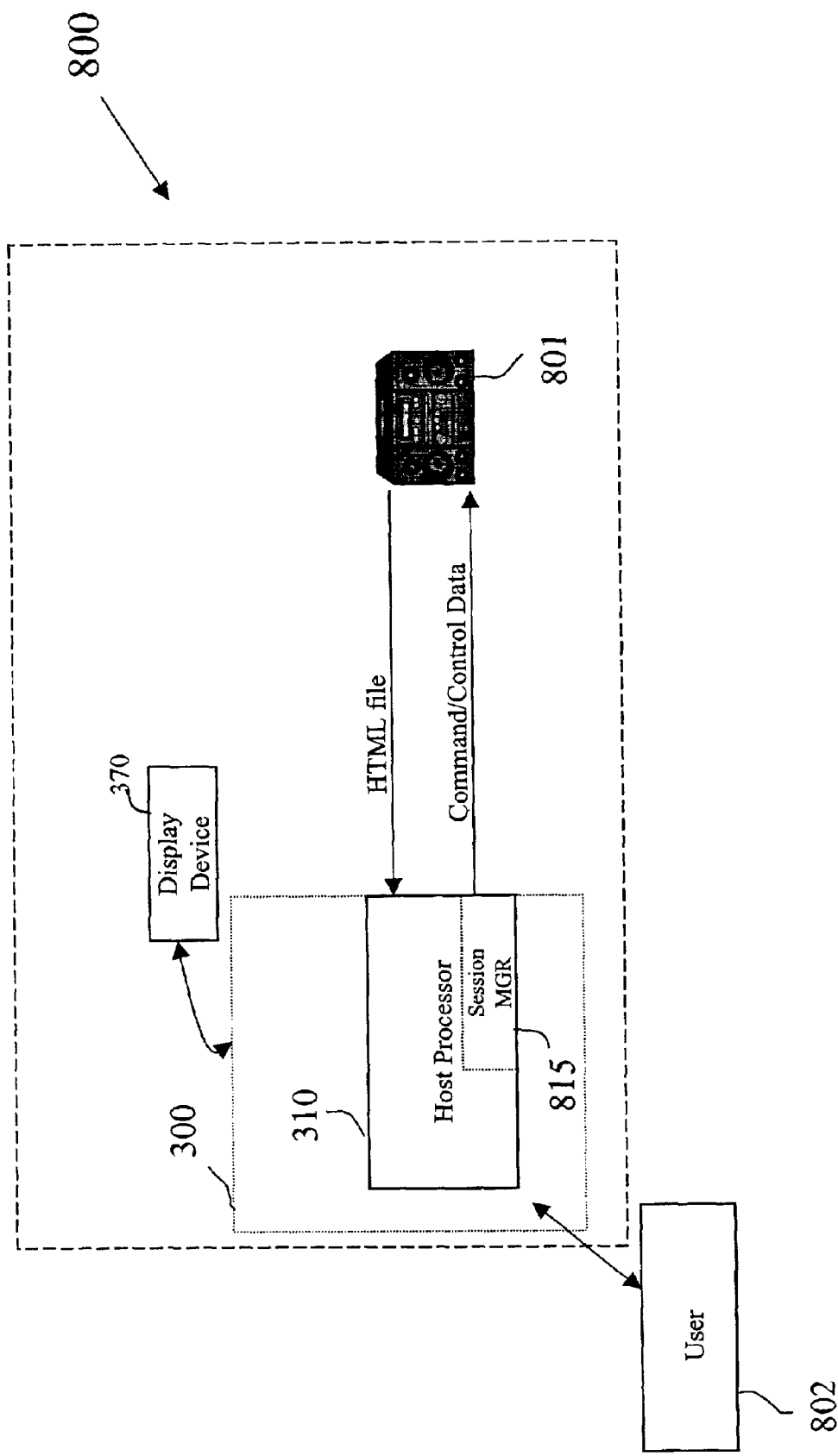
FIG. 9 illustrates a communication path configuration between STB 300 and home devices using control application techniques at the host processor.

FIG. 9 illustrates another exemplary communication path configuration between STB 300 and the devices using control application techniques at the host processor. In this embodiment, STB 300 and associated devices are configured as a home network 800. The overall structure and implementation of home network 800 is known, as evident in U.S. Pat. No. 6,198,479 to Humpleman et al., entitled HOME NETWORK, BROWSER BASED, COMMAND AND CONTROL, incorporated by reference herein.

Home network 800 includes STB 300, associated devices (designated by exemplary stereo 801), and a session manager 815. Preferably, the session manager 815 is embodied as software and/or algorithms that are embedded in host processor 310 of STB 300. In this embodiment, communication on the home network 800 is provided through the use of the Transmission Control Protocol/Internet Protocol (TCP/IP) standard network protocols. The TCP layer provides a reliable delivery mechanism while the IP layer provides a routable addressing mechanism for packets of data on the home network 800.

Each device connected to the home network 800 has one or more associated HTML files. The HTML files for a respective device define the command and control functions for that particular home device. Each HTML file may also contain embedded references to other related HTML files. STB 300 is operatively connected to a viewable display 370 (e.g., screen) and employs browser technology to receive and interpret the HTML files associated with the devices connected to the home network 800, and to graphically display the information contained via a suitable GUI on its screen.

The session manager 815 provides the primary interface between a user 802 and the home network 800. The session manager, when properly activated, generates a session page (not shown) that provides an interface that allows users to command and to control device 801 that is connected to the home network 800 in order to perform various functions and/or services. The session manager 815 in host processor 310 displays available home network services (servers) at display 370, and matches capabilities and selections to facilitate sensible and easy selection, thus simplifying use of the home network to execute a script that may be tailored in an ATVEF content specification format for example. Thus, the host processor 310 communicates a data specification message (device command and control data ordered by the script) to a designated device via the session manager 815.

Accordingly, to provide for device communication, each device 801 has a control application (not shown) associated with it. The control application for a device handles the communication between the session manager 815 of the home network 800 and the designated device 801. Therefore, the control application for STB 300 and designated devices provides a mechanism that allows two or more devices to communicate with STB 300 via session manager 815. In certain embodiments, the control application is a device-specific packet of Java code that communicates with the hardware of the respective device, thereby controlling that device. As generally shown in FIG. 7, the communication path between STB 300 and devices would be sent along the existing electrical wiring in the home, or another suitable transmission medium.

Additionally, by having a control application associated with each device 801 on the home network 800, the control implementation details of the respective device(s) 801 may be grouped and maintained within a vendor-supplied device application for example, such as supplied by a network service provider (NSP) to which the user subscribes to. The control application of the device 801 further enables the respective vendors to provide their own control scenarios for their devices. All of the control applications of the devices on the home network 800, however, must comply with certain pre-defined specifications in order to enable a respective device to communicate with the session manager 815.

Figure 10:
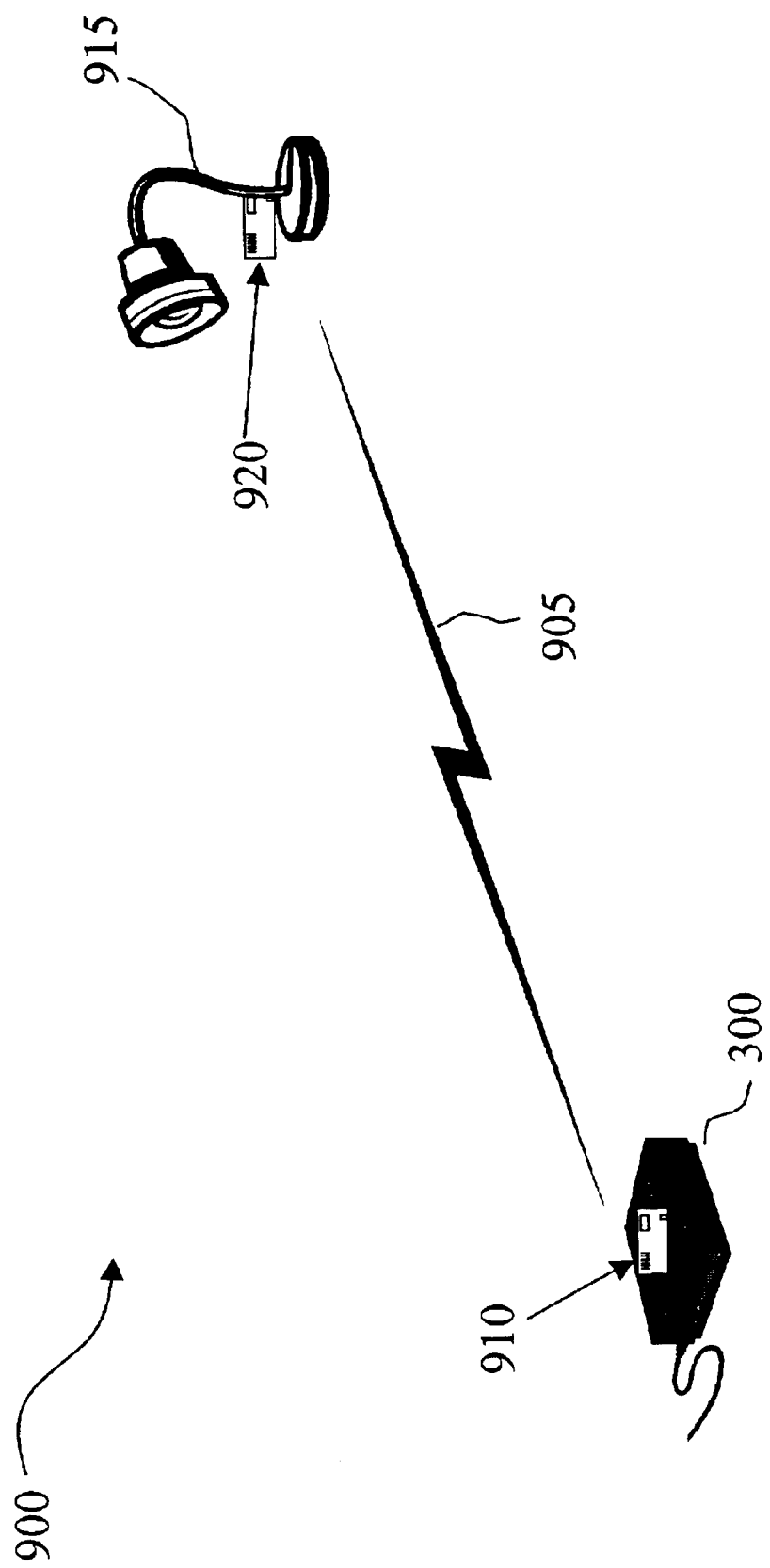
FIG. 10 illustrates a communication path configuration between STB 300 and home devices within a network using wireless links.

FIG. 10 illustrates another exemplary communication path configuration between STB 300 and the devices within a wireless network 900 using a wireless link. Instead of using existing electrical wiring (such as that within a home), a wireless spread-spectrum link 905 is used to connect devices to STB 300, such as lamp 915 illustrated in FIG. 10. Link 905 may be a direct sequence spread spectrum (DSSS) link. STB 300 and the various devices may be arranged in a network 900 such as a code-division multiple access (CDMA) network.

Spread-spectrum communications have traditionally been used in wireless links. The network includes a transmitter 910 operatively connected to STB 300, and a receiver within a network interface 920 that is operatively connected to a particular device (lamp 915 for example). The overall structure and implementation of this network is known, as evident in U.S. Pat. No. 6,218,931 to Asghar et al., entitled HOME-APPLIANCE NETWORK WITH NODES IDENTIFIED BY DIRECT-SEQUENCE SPREADING CODES, incorporated by reference herein.

Transmitter 910 includes a digital-to analog converter (DAC) that receives a stream of data, which preferably is a control signal that is generated from a running script within STB 300, and generates a baseband signal from the data stream. Transmitter 910 may also include a high-frequency oscillator that generates a carrier wave, and a high-frequency mixer that modulates the carrier with the baseband signal to generate a narrowband transmit signal. A spreading-code generator in the transmitter 910 generates a spreading code that identifies the designated device 915. A spreading mixer modulates the narrowband transmit signal with the spreading code, thereby generating a wideband transmit signal. The wideband transmit signal is then coupled into the physical medium of the network 900. In an embodiment, the physical medium is a residential wiring grid, and a wiring interface in the transmitter 910 couples the spreading mixer with the residential wiring.

A receiver in the network interface 920 receives a wideband communications signal from the network 900. In one embodiment, the network interface is a residential wiring grid, and the receiver includes a wiring interface (not shown). The receiver wiring interface provides the wideband signal to a despreading mixer (not shown in FIG. 10) that recovers a narrowband signal using a locally-generated spreading code. A detector unit demodulates the narrowband signal to recover the received data. The network interface 920 may be incorporated in a wall socket or in a light switch. Alternatively, the network interface 920 may be included in the device or inserted between the device and the residential electrical wiring.

In addition to using DSSS techniques to achieve multiple access over a wireless link, DSSS/CDMA techniques can be used to provide multiple access over a wired network. In one embodiment of the spread-spectrum network, the network elements are computing devices that communicate over a shared channel with carrier signals in the frequency range of several kHz to tens of GHz and with bit rates between 10 kbps and 500 Mbps. The channel is shared by assigning unique spreading codes to each of the computing devices. A device then encodes its transmissions on the wired network by modulating them onto a carrier signal and then spreading the modulated carrier with the appropriate spreading code. The appropriate spreading code may be that of the sender or receiver, as determined by a CDMA communications protocol.

Spread-spectrum link 905 is preferably a radio link (signal) that propagates through free space. Alternatively, the radio signal may be transmitted via a coaxial cable, twisted-pair line or other wired line, or a wave-guide. Spread-spectrum link 905 is not limited to a radio link configuration, and may be configured as an IR, visible, or other optical link, conveyed either in free space or through an optical fiber.

Figure 11:
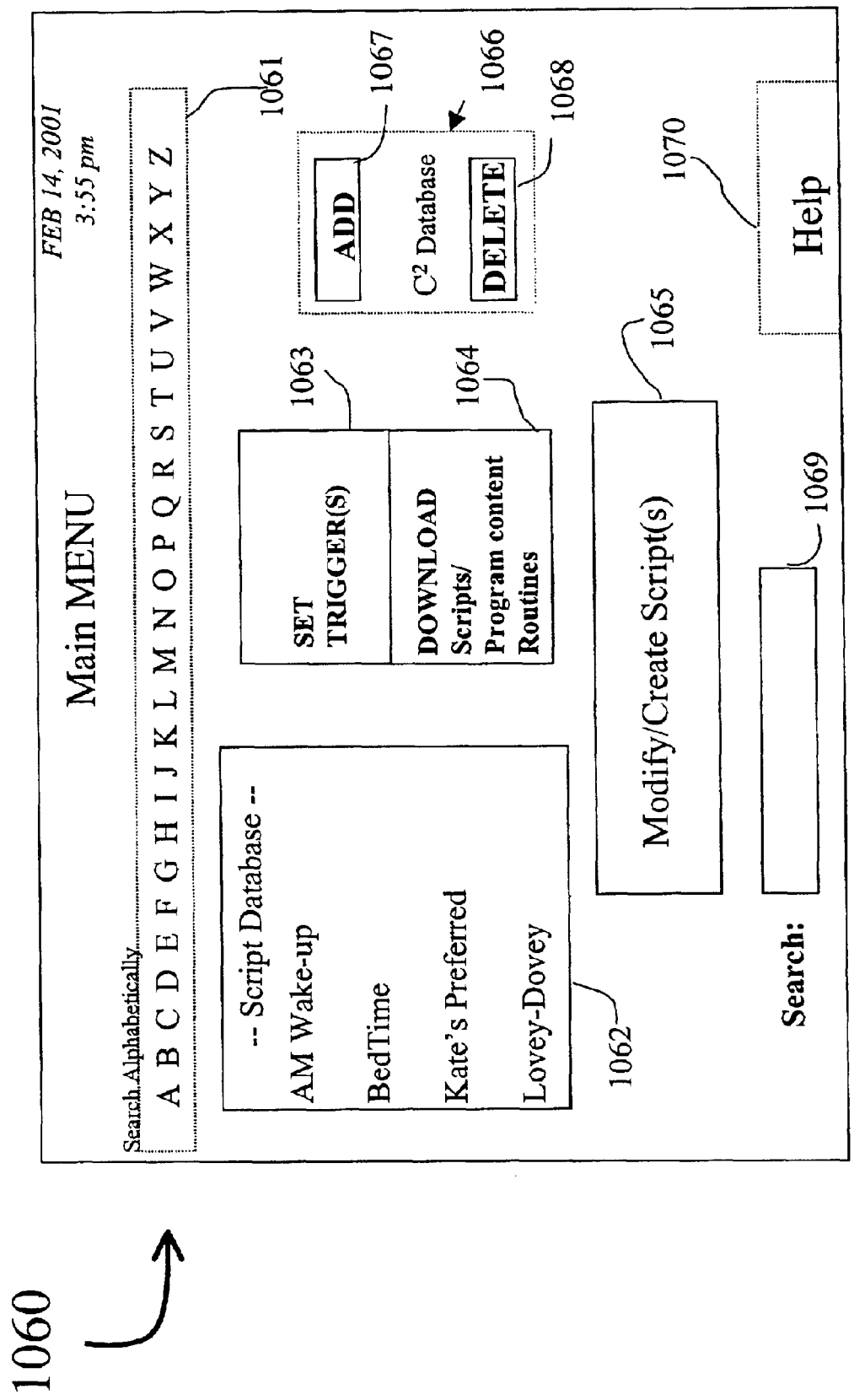
FIG. 11 illustrates an exemplary main menu screen to select scripts for device control, according to the invention.

FIG. 11 illustrates an exemplary main menu screen to select scripts for device control, according to the invention. Menu 1060 may include an alphabetical A–Z list cell 1061; a script database list 1062 cell that as a default lists the first few stored scripts in alphabetical order, and can be scrolled down if desired; a set triggers cell 1063 to allow a user to set and/or modify particular triggers for a script, and a download cell that initiates communication between STB 300 and an online network service provider (NSP) so that the user may review, select and download script(s) and/or program content routines offered by the NSP.

This present invention is not limited to these methods of script selection. Alternatively, and instead of selecting scripts to be downloaded from the internet, STB 300 may be configured to receive scripts that are downloaded from a satellite system, and/or to receive downloaded scripts on a pay-per-view basis from a satellite TV or cable provider, where a customer would select and pay for a particular "pay-per-script" event (in this case, a particular script).

Menu 1060 may include a modify/create script cell 1065. When selected, the user may be directed to a sub-cell or additional screen that prompts the user for the desired script to modify (choosing from a list or searching via the alphabet much like is illustrated in FIG. 11), or enables the use to select "New" to create a script by choosing devices and their corresponding command and control ($C^2$) information of stored on HDD 320, such as within a database, for example. Once the user confirms that the script is acceptable, i.e., the program content routines for the desired devices are contained within the script; the use may be provided with some suitable conformation prompt to which he/she confirms. Thereafter, should the user return to the main menu 1060, i.e., in one embodiment the user may manipulate a browser-like function like "BACK" such as when navigating between web pages; the new script is reflected in the script database window or cell 1062.

Additionally, menu 1060 may include a command and control ($C^2$) database cell 1066 that is composed of an add entry cell 1067 to enable manual addition of program content routines (i.e., to locally enter command and control data for a particular device that is to be stored in HDD 320); and a delete entry cell 1068 that performs functions opposite to add entry cell 1067. Further, menu 1060 may include a search cell 1069 to do a keyword search for data if desired, and a Help cell 1070 to assist the user in navigating menu 1060. A user may access menu 1060 by manipulation of a suitable user interface, so as to display the menu 1060 on the screen of a display 370.

The set triggers cell 1063 enables the user to set triggers for designated scripts. Preferably, scripts are created with the triggers preset, but cell 1063 allows the user to modify or change a specified trigger when modifying or creating a new script by selecting cell 1065. The trigger may be selected from any of time (e.g., turn on coffee pot at 6 am); content (e.g., access distance learning website to download homework assigned); programming (e.g., record "ER" every week); or event (e.g., "turn off oven if CO alarm in security system actuated"). Additionally, the user may set triggers at random based on user preference. Once a trigger is activated, the host processor 310 of STB 300 accesses and implements the desired script.

As noted, over time the user may build up the script database list 1062 by creating his/her own script. Actuating the modify/create script cell 1065 can do this. However, as to be described in more detail below, the system of the present invention automatically stores, temporarily in SDRAM 315 before storing data in a more permanent location in HDD 320, incoming script files that are downloaded via cell 1064.

The user may periodically review script database 1062 by highlighting the appropriate script by using a suitable interface such as remote control 316, mouse, keyboard etc., and then can quickly review the details of the script by right-clicking on the highlighted cell, which could display a pop-out or pull-down window (not shown) that displays the contents of the script (i.e., plurality of program content routines).

Still further, the present invention envisions the ability to set defaults as to when temporarily stored information residing in SDRAM 315 is to be erased, so as not to overly burden the processing capability of the system. For example, the system could be configured to permanently store (in HDD 320), or erase, certain scripts or program content routines after a set period of time. Alternatively, and depending on the available storage capacity, all added or downloaded scripts could be permanently stored and organized in HDD 320 by setting a particular default. Such defaults could be set by the user actuating a suitable "Setup" or "status" cell (not shown), which would display a corresponding sub cell of specified system parameters and defaults to be reviewed, set and/or adjusted by the user regarding the management of scripts and program content routines.

Figure 12:
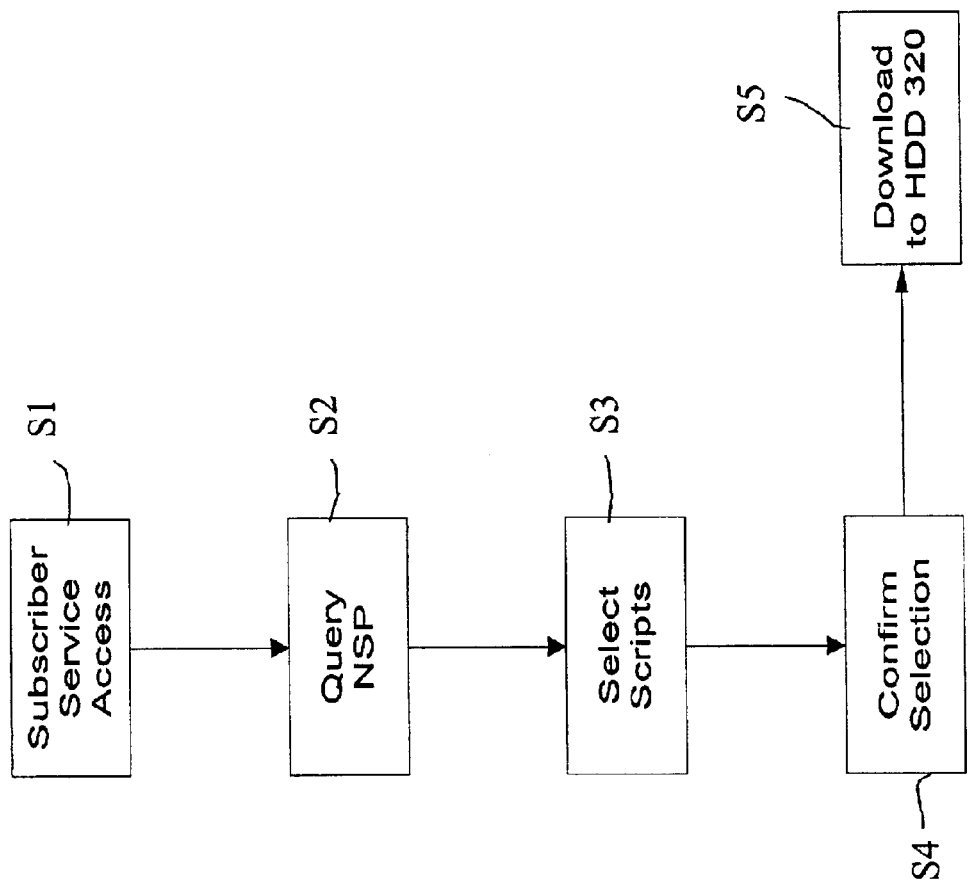
FIG. 12 illustrates an ordering method to have scripts downloaded to the STB 300 from an external network service provider.

FIG. 12 illustrates an ordering method to have scripts downloaded to the STB 300 from an external network service provider (NSP). As noted above, the system of the present invention automatically stores, temporarily in SDRAM 315 before storing data in a more permanent location in HDD 320, incoming script files that are downloaded via cell 1064. The present invention envisions a user subscribing to a service provided by an NSP, where, based on paying a monthly subscription fee for example, the user would have access to the service website in order to review, select and download desired scripts and/or individual program content routines into HDD 320 of STB 300.

Initially, a communication path is arranged between STB 300 and the NSP for subscriber service access (Step S1), via a suitable interface that could be any of a TELCO modem, DSL, Home LAN, cable modem, satellite or optical interface, or any other known communication interface which would enable communication between STB 300 and an external device or system such as a an online network server. Such interfaces enable the communication of text or HTML files to be passed digitally, under control of host processor 310 from HDD 320 through the suitable interface (via a serial port in STB 300 for example) to the website. Thus, the user would query the NSP (Step S2) to display a suitable web page or screen in which the user may input preferences and/or select desired scripts from a displayed list (Step S3). This may be effected by the well-known shopping cart model, where the user selects scripts to be temporarily buffered until ready to "check-out" at the website. Once completed, the NSP asks the user to confirm selection (Step S4) and prompts the user for downloading to HDD 320 (Step S5).

It is understood that the usability of certain scripts depends on whether the user has certain devices at their home or in their presence, and further that the command and control data for these devices are stored in HDD 320 of STB 300. However, it is envisioned that the NSP will contain a stored template of the user's various devices and associated command and control data to operate those devices; which could be provided and updated by the user accessing the NSP online, for example.

Moreover, the present invention envisions advertisers downloading prospective "free" or discounted scripts to the HDD 320 of STB 300 in return for the user promising to use a particular service offered by the advertiser for a set period of time. This is somewhat similar to that what is available today with advertisers sending mass e-mail advertisements attaching certain free services, in return for a user's promise to use their particularly offered service. For example, one scenario might be that, in return for allowing the service provider (i.e., Wall Street Journal) to advertise at the users home; a copy of the daily edition of the WSJ may be automatically fetched and displayed on a display device connected to STB 300, at 7 am each morning in the user's home. Alternatively, if the user frequently uses a PALM PILOT that is in communication with the STB 300 (i.e., such as within a wireless network); the daily edition of the WSJ could be automatically fetched and displayed on the PALM (i.e. Palm download) for the user to peruse at his or her convenience.

FIG. 13 illustrates an example of how a script is triggered and implemented in accordance with the invention. The aforementioned structure and operation of device control from the STB 300 having been explained, the inventors offer an illustrated example in FIG. 13. STB 300 is always on and in a STBY mode (Step S10). In this example, the user selects the "Lovey-Dovey" script (Step S11) from the main menu 1060 in FIG. 11 (via search cell 1069, script database 1062 or via the alphabetical cell 1061, for example). The Lovey-Dovey script contains the following program content routines:

(a) warm the oven;
(b) select a designated play list on the CD player
(c) dim lights in the living room;
(d) start propane fireplace in dining room;
(e) disable ringer(s) on phones and/or send all phone messages to voice-mail.

The preset triggers are time triggers but are currently set at 7 pm and 10 pm respectively to turn on and turn off the designated devices. The user is not satisfied with these triggers so, after highlighting the desired script on menu 1060, she actuates the set triggers cell 1063 (Step S12) to change the time triggers to 5:30 pm and midnight. Once she reviews the script, she may simply double-click on the highlighted script, and a suitable confirmation message (Step S13) such as "Lovey-Dovey script active" may temporarily flash on her display device (TV or PC screen) to indicate that all is set.

At 5:30 pm, the first trigger is activated (Step S14) and a series of simultaneous events unfold, with the host processor 310 sending suitable command instructions (Step S15) to the various devices in (a) through (e) above. This may be done via any of the above-described communication paths illustrated in FIGS. 7–10, so that when the user returns home from work at 6 pm, all she has to do is put the pre-made dinner dish in the oven, change into comfortable evening wear, and eagerly await her handsome date that evening. She doesn't have to be concerned with these devices for the rest of the evening, as the second trigger at midnight will instruct the host processor 310 to send the suitable command instructions (Step S16) to secure or turn off the various devices in (a) through (e) above.

Therefore, the present invention provides a single centralized device such as an STB to control devices such as home electronic appliances, lighting systems, heating, ventilating and air conditioning (HVAC) equipment, home security systems and home entertainment systems. The STB has enhanced functionality as compared to conventional home automation systems, since it utilizes the existing hardware and software architecture of the STB. Moreover, various menu screens associated with script or program content routine features, data or parameters may be displayed and manipulated by the user via a simple, easy-to-use graphical user interface, providing even greater flexibility.

The present invention recognizes that many people today value their free time away from the travails of work and child-rearing perhaps to a greater extent than in the past, as they work more hours, on average, than at any time in recent history. Accordingly, in an effort to simplify people's daily routines, the present invention allows the homeowner or person to easily control functions over multiple and diverse devices, applications and media within their own home environment. Additionally, the present invention takes advantage of an essentially unlimited storage capacity in the STB, and of a plurality of menu driven functions to control diverse devices, applications and media within the home with more functionality and flexibility than what is currently available.

The invention being thus described, it will be obvious that the same may be varied in many ways. For example, the functional blocks in FIGS. 3–13 may be implemented in hardware and/or software. The hardware and/or software implementations may include a combination of processor(s) and article(s) of manufacture. The article(s) of manufacture may further include storage media and executable computer program(s). The executable computer program(s) may include the instructions to perform the described operations. The computer executable program(s) may also be provided as part of externally supplied propagated signal(s).

Additionally, the inventive system may be embodied in a variety of ways; a STB 300 is just one example. Other examples include a personal computer (PC), TV or hardware card that is added to an existing apparatus such as a conventional STB, PC or TV. Further, the inventive functionality may be downloaded or otherwise programmed into a STB, PC or TV.

The above invention has primarily been described where scripts are downloaded and configured only when the user is in front of STB 300. However, the present invention is not limited to this, for in another embodiment, each script may be provided with an associated code that captures the target device/trigger/action. For example, STB 300 may be configured as a telephone answering device (TAD) with appropriate voice menus. In this configuration, users may have the option to dial in from outside to activate a particular script that has not already been scheduled. Such a scenario may be envisioned for the more advanced user who takes advantage of the full functionality of STB 300.

Additionally, where scripts may be downloaded from an online subscription service, means may be provided to generate a desired script, via HTML, providing online access to a list of existing personal scripts (with hidden associated code). By simply clicking a button on a webpage, users would be provided with a "net-phone" capable program which automates the dial-in procedure and script setup suggested above.

In an example, a man plans to meet a woman (or vice-versa) at a bar at 8:30 pm and would like to take her home. Unfortunately, his STB doesn't have a date script already scheduled that, among other functions, will adjust the thermostat to make sure she's comfortable. Fortunately, he has previously configured a script (#12345) that takes care of all his pre-date setups with an estimated time of initiation at 9 pm. To effectuate this script, he calls the number associated with the STB, enters a pin number when prompted and proceeds to enter script #12345. In an even more time-limited scenario, he might wait for her to go to the restroom and sneak over to an internet café next door. He then logs on to his subscriber account, which allows him to modify the existing script #12345 and change the initiation time to 10 pm, giving him time to drop by the grocery store before going home. It is envisioned that the host processor 310 of STB 300 will subsequently automate the dialing out and script download/setup during the time that he rushes back to my seat from the internet café before she discovers he was gone.

Accordingly, this embodiment envisions running a script remotely from the internet using any external device in communication with the STB 300, such as a PC, laptop computer, hand-held computer such as a PALM PILOT, etc., from any location. Thus in addition to enabling the user to download the scripts from the NSP, the user could be allowed to run the script from a remote PC, laptop, etc. One possible example would be during an emergency business trip from work, where the user does not have time to go home and run the script that turns off all his appliances, reduces room temperature, turns on the security system, etc. Conveniently, however, the user could do this from his laptop, which is in communication with the STB 300, while in a cab heading to the airport. This may operatively be accomplished by configuring session manager 815 of FIG. 9 to access suitable web pages for the various devices from any device, anywhere and hence run the script from the HDD 320.

Moreover, the system as shown in FIG. 1 may also include a camera that is operatively connected to STB 300. The camera would monitor a user's house (i.e., as part of the security system) and could stream the video data to a web page and/or HDD 320, that can be accessed from STB 300 or from any other device such as PC, PALM PILOT, web enabled phones etc. Such variations are not to be regarded as departure from the spirit and scope of the invention, and all such modifications as would be obvious to one skilled in the art are intended to be included within the scope of the following claims.

What is claimed is:

1. A method of controlling devices via digitally stored program content, comprising:

storing a script in a mass storage device of a media receiver configured to receive and process a media broadcast signal for presentation on a display device operatively coupled to the media receiver, the media receiver further configured to generate a graphical user interface on the display device, the graphical user interface including one or more menus associated with script selection, creation, modification, or operation, wherein the script includes program content for controlling a plurality of devices from the media selection;

accessing the stored script based on a triggering mechanism that initiates the stored script; and running the stored script to selectively control operation of at least one of the plurality of devices as designated by the stored script.

2. The method of claim 1, wherein the plurality of devices include any of home electronic appliances, lighting systems, heating, ventilating and air conditioning equipment, home security systems, home entertainment systems, and designated websites and associated internet media.

3. The method of claim 1, further comprising receiving a command from an interface selected from one of a remote control device, input device from a PC, or execution keys and buttons provided in the media receiver, to display the one or more menus on the display device that is operatively connected to the media receiver.

4. The method of claim 3, wherein the user creates a customized script from the program content stored in the mass storage device, or creates a customized script by accessing an online subscriber service to select desired program content to be contained within a downloaded script.

5. The method of claim 1, wherein storing, accessing and running are controlled by a host processor within the media receiver.

6. The method of claim 5, wherein the host processor communicates with devices designated in the script by sending commands over existing electrical wiring to modules that are plugged into the designated devices.

7. The method of claim 5, wherein the host processor communicates with devices designated in the script by sending commands via an infrared transmitter, which are received by infrared receivers operatively connected to the designated devices.

8. The method of claim 5, wherein the media receiver and the plurality of devices are arranged as a network, wherein the host processor includes a command and control interface and each device has a control application associated with it that is invoked via the host processor, and wherein the host processor communicates with devices designated in the script by invoking control application for each of the designated devices.

9. The method of claim 5, wherein the media receiver and the plurality of devices are arranged as a wireless network with the media receiver having a transmitter and each of the devices being provided with a wireless receiver, wherein the media receiver and the plurality of devices are configured to include a wireless spread-spectrum link, and wherein the media receiver is configured to communicate with devices designated in the script by sending commands between transmitter and receiver over the wireless spread-spectrum link for each of the designated devices.

10. The method of claim 9, wherein the wireless network is a home local area network (LAN) that is configured to communicate with a network service provider in order to input preferences for, select and download offered scripts or program content routines to the mass storage device.

11. The method of claim 1, wherein the mass storage device is a hard disk drive that stores a database of pre-programmed scripts, and is adapted to store individual, selectable program content routines for creating a customized script.

12. The method of claim 1, wherein the media receiver downloads a selected script into the mass storage device from a subscriber online service, based on selections made by a user.

13. The method of claim 1, wherein the script is run from a remote source.

14. The method of claim 13, wherein the source is selected from any of a PC, laptop and hand-held computer.

15. The method of claim 4, wherein the script is selected and downloaded to the media receiver from a satellite system, or selected and downloaded as a pay-per-script event from a cable or satellite TV provider.

16. The method of claim 1, wherein the script comprises a script formatted in accordance with an Advanced Television Enhancement Forum-based format.

17. The method of claim 1, wherein the one or more menus comprise a trigger setting portion, a script downloading portion, a script modifying portion, a script creating portion, an entry adding portion, an entry deleting portion, a searching portion or a help portion.

18. A media receiver for controlling devices via digitally stored program content, wherein the media receiver is coupled to a display device, the media receiver comprising:

graphics processing circuitry coupled to the display device and configured to receive input signals and to generate output signals for presentation on the display device;

a decoder coupled to the graphics processing circuitry and configured to receive and process a media broadcast signal to produce a first input signal to the graphics processing circuitry;

a mass storage device for storing a plurality of selectable scripts, wherein each of the scripts includes program content for controlling a plurality of devices from the media receiver; and a host processor for accessing a stored script based on recognition of a triggering mechanism that initiates the stored script, wherein the host processor runs the stored script to selectively control operation of at least one of the plurality of devices designated in the stored script, and wherein the host processor is further configured to generate a graphical user interface including one or more menus associated with script selection, creation, modification, or operation, the host processor producing the graphical user interface as a second input signal to the graphics processing circuitry.

19. The media receiver of claim 18, wherein the plurality of devices include any of home electronic appliances, lighting systems, heating, ventilating and air conditioning equipment, home security systems, home entertainment systems and designated websites and associate internet media.

20. The media receiver of claim 18, wherein the host processor receives a command from an interface selected from one of a remote control device, input device from a PC, or execution keys and buttons provided on the media receiver, to display a menu on the display device that is operatively connected to the media receiver, and wherein the user selects a desired script from the mass storage device.

21. The media receiver of claim 20, wherein the user creates a customized script from program content routines stored in the mass storage device, or creates a customized script by accessing the subscriber service online to select desired program content routines to be contained within the downloaded script.

22. The media receiver of claim 18, wherein the host processor communicates with devices designated in the script by sending commands over existing electrical wiring to modules that are plugged into the designated devices.

23. The media receiver of claim 18, wherein the host processor communicates with devices designated in the script by sending commands via an infrared transmitter, which are received by infrared receivers operatively connected to the designated devices.

24. The media receiver of claim 18,
wherein media receiver and the plurality of devices are arranged as a network,
wherein the host processor includes command and control application circuitry and each device has a control application associated with it that is invoked via the host processor, and
wherein the host processor communicates with devices designated in the script by invoking a control application for each of the designated devices.

25. The media receiver of claim 18,
wherein media receiver and the plurality of devices are arranged as a wireless network with the media receiver having a transmitter and each of the devices being provided with a wireless receiver to receive a wireless spread-spectrum link, and
wherein media receiver communicates with devices designated in the script by sending commands between transmitter and receiver over the wireless spread-spectrum link for each of the designated devices.

26. The media receiver of claim 25, wherein the wireless network is a home local area network (LAN) that is configured to communicate with a network service provider in order to input preferences for, select and download offered scripts or program content routines to the mass storage device.

27. The media receiver of claim 18, wherein the mass storage device is a hard disk drive that stores a database of pre-programmed scripts, and is adapted to store individual, selectable program content routines for creating a customized script.

28. The media receiver of claim 18, wherein a selected script is downloaded into the mass storage device from a subscriber online service.

29. The media receiver of claim 18, wherein the triggering mechanism is selected from one of a time trigger, content trigger, programming trigger and event trigger.

30. The media receiver of claim 18, wherein the script is run from a remote source.

31. The media receiver of claim 30, wherein the source is selected from any of a PC, laptop and hand-held computer.

32. The media receiver of claim 21, wherein the script is selected and downloaded to the media receiver from a satellite system, or selected and downloaded as a pay-per-script event from a cable or satellite TV provider.

33. The media receiver of claim 18, wherein at least one of the plurality of selectable scripts comprises a script formatted in accordance with an Advanced Television Enhancement Forum-based format.

34. The media receiver of claim 18, wherein the one or more menus comprise a trigger setting portion, a script downloading portion, a script modifying portion, a script creating portion, an entry adding portion, an entry deleting portion, a searching portion or a help portion.

35. The media receiver of claim 18, wherein the host processor comprises a session manager configured to generate the graphical-user interface.

36. A computer program product comprising a computer-readable medium having computer program logic stored thereon for enabling a processor in a media receiving system configured to receive and process media broadcasting signals and present the signal on a display device operatively coupled to the media receiving system, the computer program logic enabling the media receiving system to control devices with content that is digitally stored in the system, the computer program logic causing the processor to:
generate a graphical user interface including one or more menus associated with script selection, creation, modification, or operation on the display device operatively coupled to the media receiving system,
store a script in a mass storage device of the system, wherein the script includes program content for controlling a plurality of devices from the system;
access the stored script based on a triggering mechanism that initiates the stored script; and
run the stored script to selectively control operation of at least one of the plurality of devices as designated by the stored script.

* * * * *